United States Patent [19]

Bergquist et al.

[11] 3,763,321

[45] Oct. 2, 1973

[54] TRUNK CIRCUITS FOR ELECTRONIC TELEPHONE SYSTEMS

[75] Inventors: George R. Bergquist; Matyas Hugyecz, both of Rochester, N.Y.

[73] Assignee: Stromberg-Carlson Corporation, Rochester, N.Y.

[22] Filed: Nov. 29, 1971

[21] Appl. No.: 202,788

[52] U.S. Cl. .......................................... 179/18 AH

[51] Int. Cl. .......................................... H04m 7/00

[58] Field of Search ............. 179/18 AH, 18 FF FG, 179/18 E

[56] References Cited

UNITED STATES PATENTS 3,496,303 2/1970 Pharis .......................... 179/18 AH 3,567,866 3/1971 Briley .......................... 179/18 AH

*Primary Examiner*—Thomas W. Brown

*Attorney*—Charles C. Krawczyk et al.

[57] ABSTRACT

Various telephone trunk circuits and their functions are described for an electronic telephone system for providing interface circuits for trunk lines connected thereto. The trunk circuits include outgoing, incoming, and two-way loop trunk circuits, and outgoing, incoming, and two-way E and M signalling trunk circuits. Provisions are included for seizure of the trunk circuit by the trunk scanner, the transmission of supervisory signals for completing the connections, and the transmission of audio signals therethrough.

10 Claims, 7 Drawing Figures

PATENTED OCT 2 1973 3,763,321

SHEET 1 OF 7

GEORGE R. BERQUIST
MATYAS HUGYECZ
*INVENTORS*

BY Charles C. Krawczyk
Donald M. Winegar
ATTORNEYS

GEORGE R. BERGQUIST
MATYAS HUGYECZ
INVENTORS

BY Charles C. Krawczyk
Donald M. Winegar
ATTORNEYS

GEORGE R. BERGQUIST
MATYAS HUGYECZ
INVENTORS

BY Charles C. Krawczyk
Donald M. Winegar
ATTORNEYS

GEORGE R. BERGQUIST
MATYAS HUGYECZ
INVENTORS

BY Charles C. Krawczyk
Donald M. Winegar
ATTORNEYS

GEORGE R. BERGQUIST
MATYAS HUGYECZ
*INVENTORS*

BY Charles C. Krawczyk
Donald M. Winegar
*ATTORNEYS*

GEORGE R. BERGQUIST
MATYAS HUGYECZ
INVENTORS

BY Charles C. Krawczyk
Donald M. Winegar
ATTORNEYS

GEORGE R. BERGQUIST
MATYAS HUGYECZ
INVENTORS

BY Charles C. Krawczyk
Donald M. Winegar
ATTORNEYS

TRUNK CIRCUITS FOR ELECTRONIC TELEPHONE SYSTEMS

BACKGROUND OF THE INVENTION

This invention relates to trunk circuits for electronic telephone systems and, in particular, to the various functions of the trunk circuits to provide the necessary interconnections between the calling and the called parties in addition to providing supervisory functions for the circuits.

With the advent of electronic telephone switching systems, the telephone trunk circuits must be capable of performing a plurality of functions more quickly and more reliably than prior art electromechanical systems. Additionally, provisions must be made within the trunk circuitry to cause the release of equipment when a party inadvertently forgets to hang up at the close of a telephone conversation. Further, trunk circuits must provide a means to prevent a particular trunk circuit from being seized again when already in use as well as to prevent the dialing of digits before the switching system is prepared to accept dial pulses.

An object of this invention is to provide a new and improved trunk circuit suitable for use in electronic telephone switching systems.

Another object of this invention is to provide a new end improved trunk circuit for an electronic telephone switching system wherein when a called party disconnects and the calling party remains off hook, a forced disconnect of the calling party occurs after a predetermined interval of time.

A further object of this invention is to provide a new and improved trunk circuit for an electronic switching system wherein an equipment busy signal is provided to an associated junctor when dialing occurs prior to the enabling of a register to receive dial pulses.

Other objects will, in part, be obvious and will, in part, appear hereinafter.

BRIEF DESCRIPTION OF THE INVENTION

Figure 1:
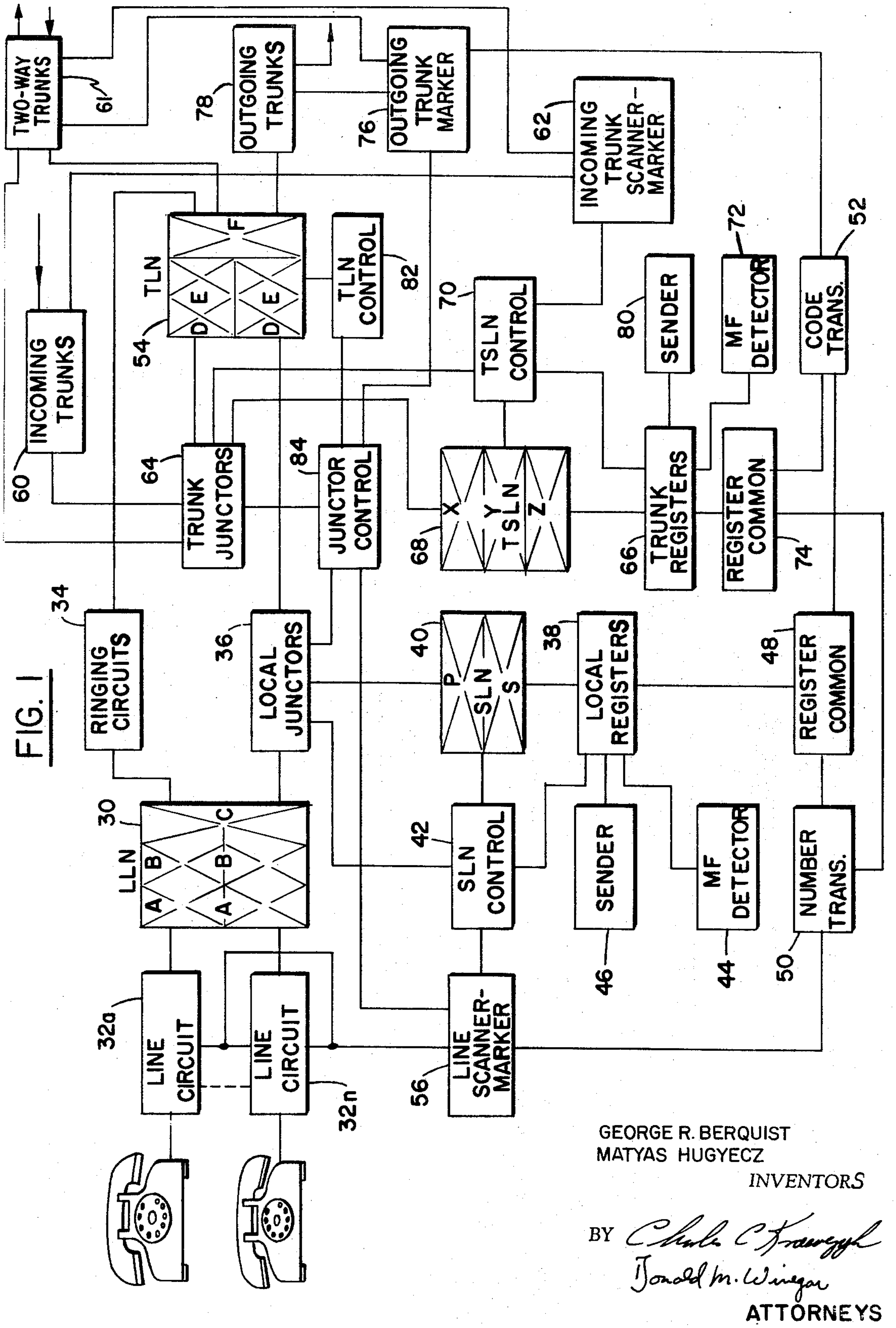
FIG. 1 is a block diagram of an electronic telephone switching system.

The present invention provides trunk circuits for trunk lines extending to outside world circuits to a telephone switching system. The trunk circuits comprise outgoing trunks, loop and E and M types, incoming trunks, loop and E and M types, and two-way trunks, loop and E and M types. Provisions are provided for in the incoming trunk circuits for transmitting a request for service signal for seizure by a trunk scanner-marker arrangement. Provisions are provided in the outgoing trunks for seizure by a trunk marker arrangement. The two-way trunk circuits include provisions for seizure by a trunk scanner-marker arrangement in a manner depending upon the mode of operation, i.e., incoming or outgoing.

The loop trunks are adapted to be connected to a two-wire trunk line while the E and M trunks are adapted to be connected to a three wire trunk line. Each of the trunk circuits include an originating, or preceding, direct current loop and a terminating or forward, direct current loop. Sensing means are included in at least one of the loops for operating a relay in response to open and closed loop conditions. In the loop trunks, voice,seizure, supervisory and dial signals are transmitted by the loop circuits to the two wire trunk lines, while in the E and M type trunks, voice signals are transmitted via two lines and seizure, supervisory and dial signals are transmitted via the third line. The trunk circuits, other than the incoming E and M trunks, include means for reversing the polarity in at least one of the originating or terminating loops to provide an answer supervision signal. In the case of the incoming loop trunk, the two-way loop trunk, the incoming E and M trunk, and the two-way E and M trunk, provisions are included for detecting a reverse in polarity in battery potential to a loop for operating a relay and providing an answer supervision signal by reversing the connection in the other loop. Various interlocking time out, or release delay, relay circuits are provided to assure that the trunk loop circuit in the process of establishing a call remains connected during the transmission of various supervisory signals and dial pulses, and the like. However, the time out circuits provide for forced disconnections when one of the calling or called parties hang up and the other remains connected.

DESCRIPTION OF THE PREFERRED EMBODIMENT

The trunk circuits of the invention will be described in conjunction with the telephone circuit of FIG. 1. The telephone switching system of FIG. 1 includes a line link network (LLN) 30 which functions as a concentrator for originating line calls and a fan out for terminating calls. The LLN consists of three stages of matrices A, B and C, and is used for both originating and terminating types of traffic. The LLN 30 is connected at one end to a plurality of line circuits 32*a*–32*n*, which vary in number depending upon the telephone service to be offered. The line circuits 32*a*–32*n* are more fully described in U.S. Pat. No. 3,708,627 issued Jan. 2, 1973 and entitled, "Telephone Line Circuit Arrangement," for Otto Altenburger and is assigned to the assignee of the present invention. The line link network provides one unique path between circuits connected to opposite ends of the network. Each of the switching networks in FIG. 1 include matrix switches comprised of relays including a mark or control winding for initially actuating the relay and a hold or sleeve coil connected in series with its own contacts for maintaining the relay actuated after a path through the network has been established.

The C stage of the LLN provides the termination for both originating traffic from the line circuits 32*a*–32*n* and incoming traffic to the line circuits. These terminations of the LLN are connected to the local junctors 36 for originating traffic and the ringing controls 34 for terminating traffic. The number of local junctors and ringing controls provided depends upon the traffic requirements for the system. The ringing controls are more fully described in U.S. Pat. No. 3,671,678, issued June 20, 1972, and entitled "Ringing Control Circuit," in the name of Otto Altenburger and is assigned to the assignee of the present invention. The junctor circuit 38 and its control (junctor control 84) is more fully described in U.S. Pat. No. 3,705,268, issued Dec. 5, 1972, and entitled Passive Junctor Circuit And Selectively Associated Junctor Control, in the name of Otto Altenburger and is assigned to the assignee of the present invention.

The local junctors 36 serve as the focal points for all originating type traffic. The local junctors include provisions for connecting the line circuits to the local registers 38 via a service link network (SLN) 40, and for providing transmission battery for calling and called parties on intraoffice calls. The local junctors 36 are under the control of the calling party. When trunk or station busy conditions are encountered, the local junctors 36 provide the busy tone to the calling party.

The service link network 40 includes two stages of matrices (P and S) and is controlled by a SLN control circuit 42 for connecting the calling line circuit 30*a*–30*n* (via one of the local junctors 36) to one of a plurality of local registers 38. The local registers 38, when connected to the local junctors 36, provide dial tone and include apparatus for acting on the subscriber instructions. The local junctors 36 terminate on the P stage and the dial pulse acceptors in the local registers terminate at the S stage. The dial pulse acceptors function as an interface between the local junctors 36 and the local registers 38. The dial pulse acceptors (DPA) provide the dial tone to the calling subscriber and also detect rotary dial pulses and extend the pulses to storage sections in the local registers. In the event of multifrequency signalling by the subscriber, the frequencies are detectd by MF detectors 44 connected to the dial pulse acceptors. The local registers 38 consist of a DPA, register storage and register output and are connected to a sender 46 for providing outpulsing. The registers and senders are controlled by a register common 48 which contains the necessary control units. The local registers 38 are connected to the register common 48 on a time division multiplex basis wherein information is passed from one equipment to another on a common bus basis. The register common 48 is also connected to communicate with a number translator 50 and a code translator 52 on a time division multiplex basis. The translation circuits provide information such as equipment number, ringing codes and class of service. The number translator 50 is connected to the line scanner-marker circuit 56 which has the means to detect service requests and means to access the individual line circuits 32*a*–32*n*.

The ringing controls 34 connect rining generators to terminating or called stations, detect off hook conditions (ring-trip) of the called station, and provide ringback tone for the calling station. Each line circuit can be connected to any of a plurality of ringing controls which are accessed from a trunk link network (TLN) 54 so that a ringing control is automatically connected to the terminating line circuit as soon as a connection to that line is complete.

A line scanner circuit 56 continuously checks the line circuits 32*a*–32*n* for an off hook condition. The line scanner-marker circuit 56 is used for both originating and terminating types of traffic. In the event of originating traffic, a line scanner stops when an off hook condition is detected and transmits the information from its counter circuits to a marker circuit to mark the particular line circuit 32*a*–32*n* and enables the SLN control 42 to initiate a path finding operation between an available local register and the line circuit requesting service. In the event of terminating traffic, the line scanner is controlled by the number translator, wherein the line scanner-marker receives an equipment number from the number translator to mark the line circuit 32*a*–32*n* with the particular equipment location. Furthermore, in terminating traffic, the line marker is also involved in transmitting the terminating subscriber classes of service, ringing code, busy or idle status, and types of ringing required through the junctor control 84 to the ringing control 34. The line scanner-marker circuit 56 is more fully described in U.S. Pat. No. 3,699,263, issued Oct. 17, 1972, and entitled "Line Scanner and Marker Arrangement Using Group Scanning", in the names of Gunter Neumeier and Otto Alternburger and is assigned to the assignee of the present invention.

In operation, when a telephone goes off hook, the line scanner-marker 56 detects the off hook condition and marks the line circuit connection to the A stage of the LLN 30. Simultaneously, the line scanner-marker circuit 56 signals the SLN control 42 to begin its path finding process for connecting the marked line circuit to one of the local registers 38. The SLN control detects and locates a path between the off line circuit and a free register. When path finding is complete, the selected matrix relay coils in the LLN and the SLN are energized. The metallic connections through the tip and ring leads are checked. If the connection is complete, the sleeve coil connections are completed, and the connected local junctor 36 is seized. At this time, the SLN control 42 and the line scanner-marker circuit 56 are released, and the local register 38 is connected to the subscriber to receive dial information. Once the subscriber information has been dialed into a local register 38, the call must be routed either internally to another local subscriber, or externally to another exchange via one of a plurality of outgoing trunks 78 or one of a plurality of two-way trunks 61.

Incoming calls from other exchanges are made via one of a plurality of incoming trunk circuits 60 via one of a plurality of two-way trunk circuits 61. An incoming trunk scanner-marker circuit 62 continuously scans the incoming trunks 60, and the two-way trunks 61, looking for a trunk circuit seized by a distant office. When a seized trunk circuit is located, a scanner circuit stops and transmits the trunk equipment number to a marker circuit, identifying the particular trunk circuit. The identified trunk circuit is also connected to a trunk junctor 64 which, in turn, is similar to a local junctor 36, and is connected to the trunk circuits 60 and 61, the TLN network 54, and a trunk service line network (TSLN) 68. The trunk junctor 64 functions as a focal point for all incoming trunk type traffic and includes provisions for connecting the seized trunk circuit to any one of a plurality of trunk registers 66 via the trunk service line network (TSLN) 68. The trunk junctors 64 also provide the incoming and the called party with transmission battery, and when encoutering either trunk or station busy conditions, returns a busy tone to the incoming call.

The TSLN control 70 functions to locate a path between the trunk junctors 64 and the trunk registers 66. The trunk junctors 64 are terminated on the stage X matrix modules of the TSLN 68 while the trunk registers 66 are terminated at the Z stage matrix modules. The trunk registers 66 include a dial pulse acceptor interface and subcircuits including register storage and register output. A multifrequency detector 72 is also connected to the trunk registers. The subcircuits and the multifrequency detector 72 are controlled by a register common control 74 on a time division multiplex basis. The register common is connected to communicate with the number translator 50 and the code translator 52 on a time division basis. The code translator is connected to the outgoing trunk marker circuit 76 to identify outgoing trunk groups 78. The outgoing trunk marker circuit is more fully explained in a copending patent application, Ser. No. 103,267, filed on Dec. 31, 1970, now U.S. Pat. No. 3,697,328, entitled "Outgoing Trunk Marker," filed in the names of Otto Altenburger and David Stoddard and is assigned to the assignee of the present invention. A sender circuit 80 is also connected to the trunk registers 66 to provide outgoing pulsing.

When a free path through the TSLN is found, the mark relay coils in the X, Y and Z matrix modules in a path to a trunk register are energized. When the connection between the trunk junctors 64 and the trunk registers 66 is completed, the metallic connections through the tip and ring leads are checked and then the sleeve connections are completed. The TSLN control and the incoming trunk marker 62 are now released. Once the incoming information has been received by one of the trunk registers 66, the call is either routed internally to a local subscriber, or externally to other exchanges via the outgoing trunks 78 or the two-way trunk circuits 61.

The TLN 54 provides for the termination of the local traffic to the local subscribers, the termination of incoming calls from other exchanges to the local subscribers, and for the connection of incoming calls from other exchanges to other external exchanges. The TLN 54 includes D and E stage matrices. When further expansion is necessary, an F stage matrix is included as illustrated. The D stage is the entrance to the TLN and is connected to the local junctors 36 and to the trunk junctors 64. The F stage is the exit of the TLN network and is connected via the ringing controls 34 to the LLN 30 and also to the outgoing trunks 78 and two-way trunks 61.

The path finding through the TLN 54 is under the control of the TLN control 82 and the junctor control 84. The TLN control 82 and the junctor control 84 work together in completing the termination portion of a call, whether it is an internally terminated call, or an outgoing call to a distant office. The number translator 50 and line scanner-marker 56 are used to complete calls to local lines, and the code translator 52, together with the outgoing trunk marker 76 complete calls via trunks. The local junctor 36, or the trunk junctor 64, have been previously marked (depending upon whether it is an incoming call or locally generated call). Furthermore, the information in the local or trunk registers is transmitted from the register via the register common 48 or 74 to either the number translator 50 or the code translator 52, depending upon whether it is a call terminating to a local subscriber, or a call going via a trunk circuit to a distant exchange, respectively. In the event of a call terminating to a local subscriber, the number translator 50 via the line scanner-marker circuit 56 marks the line circuit of the terminating call. In the event of an outgoing call, the code translator 52 via the outgoing trunk marker circuit 76 marks the particular outgoing trunk 78 or the two-way trunk circuit 61.

When a free path is formed, the mark relay coils are energized in the TLN and LLN. After a metallic path check is made via the tip and ring leads, the sleeve connections are picked up to complete the connection through the TLN and LLN.

The ringing control 34 now rings the called party. The connections through the LLN 30 and the TLN 54 and the local or trunk junctors 36 or 64 are maintained during the call under the control of the calling party. When the calling party hangs up, all the connections are broken. In the event the calling party still remains off hook after the called party hangs up, provisions are included in the trunk circuits so that the connections are broken after a predetermined interval of time.

A path finding scheme for the SLN, TLN and TSLN networks is disclosed in a copending patent application, Ser. No. 153,221, filed on June 15, 1971, entitled "Path Finding System" for Otto Altenburger and Robert Bansemir.

The various trunk circuits 60, 61 and 78 of this invention provide the interface between the local central office embodying the switching system of FIG. 1 and the outside world. These trunk circuits are suitable for use, back-to-back with other switching systems of the same type. Additionally, the trunk circuits of this invention can be interfaced with any dial-dial automatic system type trunks and step-by-step telephone systems providing the interfaced trunk systems have the same loop, pulsing and supervisory requirement.

OUTGOING TRUNK CIRCUIT – LOOP-REVERSE BATTERY

Figure 2:
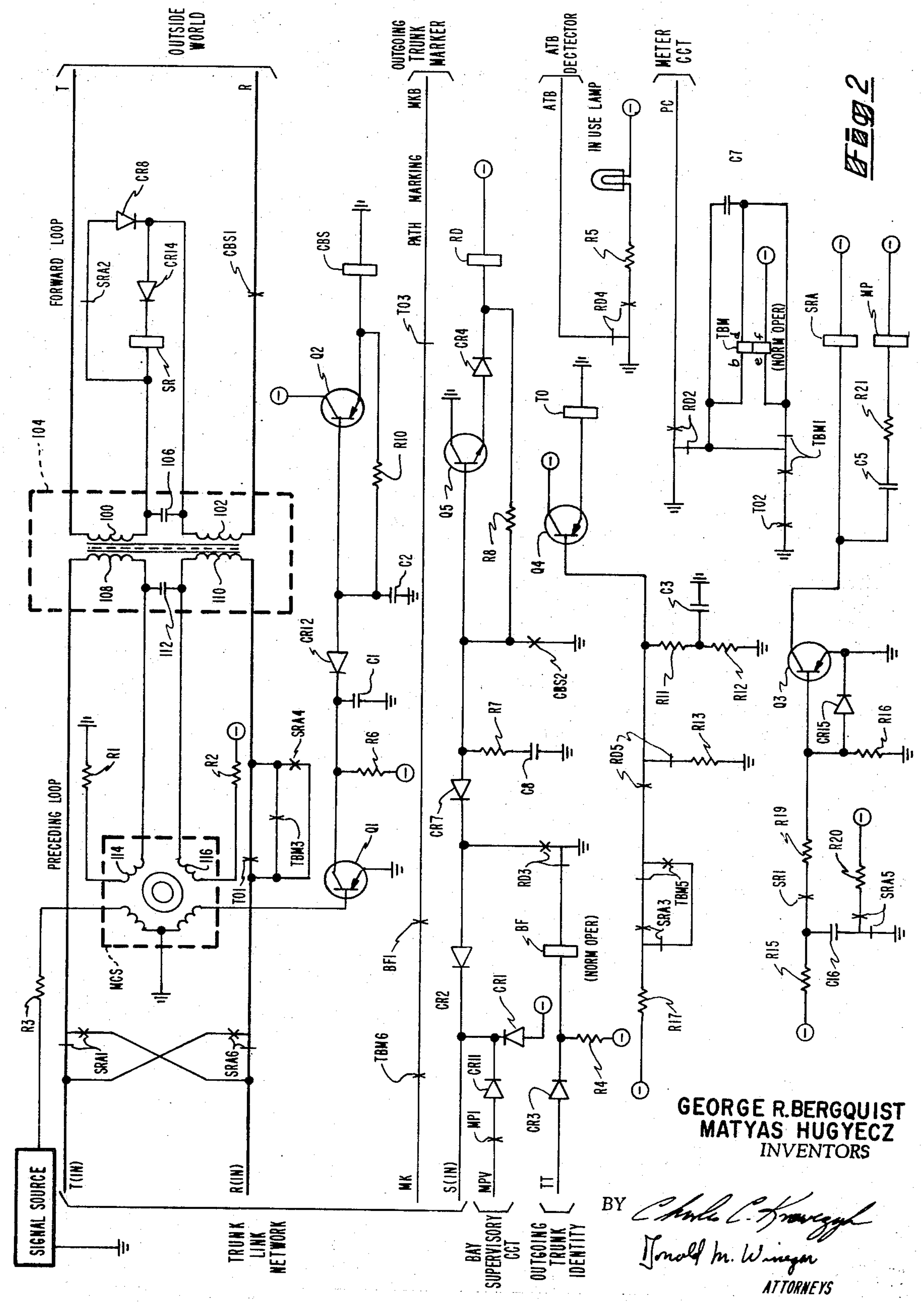
FIG. 2 is a schematic of an outgoing trunk circuit, loop signalling type, suitable for use in the system of FIG. 1.

Referring now to FIG. 2, in addition to FIG. 1, there is shown a schematic diagram of an outgoing trunk circuit - loop-reverse battery type suitable for use as an outgoing trunk 78 (FIG. 1). The trunk circuit 78 functions as an interface between the switching system of the central office in which it is located and the outside world (OSW). The outgoing trunk circuit includes a preceding loop which is associated with a particular portion of the TLN 54 and a forward loop which is associated with a particular telephone circuit such, for example, as a trunk circuit or a line circuit in the outside world.

A calling subscriber line circuit or an incoming trunk circuit is connected via the TLN 54 to the tip and ring leads T(in) and R(in) of the preceding loop of the outgoing trunk circuit. The connection to the tip and ring leads saturates the magnetic core MCS via the incoming loop including the windings 108 and 110 of the repeat coil 104 and the windings 114 and 116 of the magnetic core sensor MCS and the resistors R1 and R2 via the closed contacts TBM3 of a normally operated transmission battery monitor relay TBM. The relay TBM is normally operated via the contacts RD2 and through coils *b,d* and *e,f* in series. Upon becoming saturated, the transformer action of the magnetic core sensor MCS ceases, thereby turning off the transistor Q1. The turning off of the transistor Q1 turns on the transistor Q2, thereby operating the calling bridge slave relay CBS. The operated relay CBS actuates the contacts CBS1 and CBS2. The actuated contacts CBS1 close the outgoing loop including the secondary winding 100 and 102 of the repeat coil 104 and a supervisory relay SR to a battery feed circuit in the outside world telephone circuit being called. The outside world telephone circuit, when seized, applies battery to the leads T and R. The actuated contacts CBS2 operates the release delay relay RD, via transistor Q5, thereby grounding the sleeve lead S(in) and retaining the associated matrix crosspoints in an operated condition. The grounding of the lead S(in) also prevents a second seizure of the particular outgoing trunk circuit while it is a working telephone connection.

The operated relay RD actuates the contacts RD2 through RD5. The actuated contacts RD5 operates a time out relay T0. The acuated contacts RD2 deactuate the normally operated relay TBM. The capacitor C7 makes the TBM slow to release so that relay TBM is reenergized through the closed contacts T02 and TBM. The relay TBM is retained operative to prevent the preceding loop from opening and releasing the seized trunk after the relay T0 drops as discussed in a later portion of the specification. At the same time, a ground signal via contacts RD2 is impressed on the peg count lead PC to the metering circuit for monitoring functions. Such suitabe monitoring functions include an optional message rate metering, provided on a preferred basis of one meter per meter lead.

The actuated contacts RD3 release the normally operated busy-free BF relay actuating the contacts BF1, thereby opening the mark lead. The opening of the mark lead renders the trunk circuit busy to prevent seizure of the same trunk circuit for another outgoing call for the duration of this telephone connection. The actuated contacts RD4 operate the "in use" lamp to provide a visual signal that the trunk circuit is in use. In addition, the actuated contacts RD4 removes ground from the all trunks busy lead ATB to an ATB detector (not shown). The ATB detector monitors a group of outgoing trunk circuits such, for example, as a group of 10. When all the monitored trunks are busy, an associated junctor initiates an equipment busy signal to a calling party seeking to seize one of the monitored trunks. In addition, the ATB detector provides a means to monitor traffic for upgrading the system's equipment when necessary. Operating the relay T0 actuates the contacts T01 through T03. The actuated contacts T01 close to bypass the contacts TBM3. The actuated contacts T03 also open the mark lead to the outgoing trunk marker 76 (FIG. 1) as a means to assure the prevention of a second seizure of the trunk circuit while the circuit is in use.

The calling party's dialing information has been stored in either a local register 38 or a trunk register 66. When the marked lead was opened, the junctor control 84 initiated a release sequence for the outgoing trunk marker 76 and the code translator 52. The code translator initiates the sequence to start outpulsing of the stored dial pulses or information. The outpulsing of the dialed information is performed by the sender 80 which causes the magnetic core sensor MCS to alternately saturate and unsaturate. The alternate saturation and unsaturation of the core MCS causes the relay CBS to pulse in accordance to the outgoing dial pulses. The relay CBS therefore operates periodically, thereby repeating the sender's dial pulsing to the distant trunk circuit via the contacts CBS1. The repeated dial pulsing is sent to a remote register or is used to step associated equipment identified and actuated by the dialed pulses.

When the called party answers, the battery potential across lines T and R from the outside world telephone circuit is reversed. This reverse battery operates the relay SR. The operated relay SR actuates the contacts SR1 and closes the circuit to a supervisory relay-assist relay SRA, and the relay SRA is operated. The operated relay SRA actuates the contacts SRA-1 through SRA-6. The actuated contacts SRA-1 and SRA-6 repeat the battery reversal across the leads T(in) and R(in) to the calling party to provide an answer supervision signal. This answer supervision signal is of importance when the calling party is from another remote central office and the outgoing trunk circuit is employed here as a tandem connection. The answer supervision signal therefore tells the distant calling party that the called party has answered.

The actuated contacts SRA-4 close to bypass the contacts T01 and TBM3. The actuated contacts SRA-3 open the circuit to the relay T0. The relay T0 begins to "time out" as a function of the RC discharge time of the resistors R11 and R12 and capacitor C3 and will be released after a preset interval of time such, for example, as approximately 20 seconds.

Additionally, the actuated contacts SR1 operate the meter pulse relay MP via the transistor Q3 for a preset period of time determined by the charging of the capacitor C5. An interval of time, such, for example, as from 50 to 70 milliseconds has been found sufficient. This time interval is necessary to provide sufficient time to actuate a meter, if used with the circuit. The actuation of the meter will occur when the contacts MP1 close the meter pulse-voltage lead MPV to the meter. A meter pulse such, for example, as 48 volts is applied via the MPV lead on the sleeve lead S(in) to the TLN 82. The meter pulse may perform a variety of functions such, for example, as signalling an adapter to collect coins, in the case of a paystation being the calling party, or to peg a line meter when message rate metering is used.

After the relay MP is actuated and subsequent deactuated, the relay T0 releases. The released relay T0 actuates the contacts T01, T02 and T03. The actuated contacts T01 open the ring lead, however, the ring lead from the TLN 54 remains connected to thd repeater coil via the contacts TBM3 and SRA4. The contacts T03 close preparing the path marking lead MK-MKB for scanning purposes once the busy-free relay BF is reoperated. The actuated contacts T02 disconnect ground from the relay TBM. The relay TBM releases reoperating the relay T0 via contacts BD5, TBM5 and SRA3.

The released relay TBM reactuates the contacts TBM1, TBM3, TBM5 and TBM6. The reactuated contacts TBM1 opens the path that locks the relay TBM to ground through the closed contacts T02. The reactuated contacts TBM3 open, however, the contacts are bypassed by the contacts T01 and SRA4. The reactuated contacts TBM6 open the mark lead between the TLN 54 and the outgoing trunk marker 76 assuring that the trunk circuit continues to signal a busy condition.

The telephone connection is now completed between the calling and the called parties. Telephony communication is now possible between the two parties via the repeater coil 104 and capacitors 106 and 112.

When the calling party goes on hook, the magnetic core MCS becomes unsaturated. Transformer action of the core MCS causes current to flow and turns on the transistor Q1. With the transistor Q1 turned on, transistor Q2 turns off and releases the relay CBS. The released relay CBS actuates the contacts CBS1. The reactuated contacts CBS1 open the ring lead in the forward loop and release the seized outside world telephone circuit. The opening of the forward loop releases the relay SR. The released relay SR releases the relay SRA. The reactuated contacts CBS2 release the relay RD which opens the operate path to the relay T0. The relay T0 is now released. In addition, the released relay RD reoperates the relays TBM and BF to their respective normally operated state. The seized outgoing trunk circuit has now been released and is returned to an idle state condition to await the next seizure. The path marking circuit is ready for marking for seizure of the trunk circuit for the next call.

When the called party goes on hook before the calling party hangs up, the relays SR and SRA are released. Should the calling party remain off hook, however, the relay T0 begins to "time out" via its associated time out circuit, including capacitor C3, and the resistors R11 and R12. After a preset interval of time such, for example, as 20 seconds, the relay TO releases. The released relay TO opens the ring lead of the loop connection from the TLN 54 forcing the disconnection of the calling party and releasing the relay CBS. The released relay CBS releases the relay RD and reoperates the relays TBM and BF to their normally operated state. The seized outgoing trunk circuit is returned to an idle state condition. This prevents the telephone equipment from being unnecessarily tied up or essentially made inoperative by a calling party forgetting to go on hook when the called party has gone on hook.

INCOMING TRUNK CIRCUIT — LOOP-REVERSE BATTERY

Figure 3:
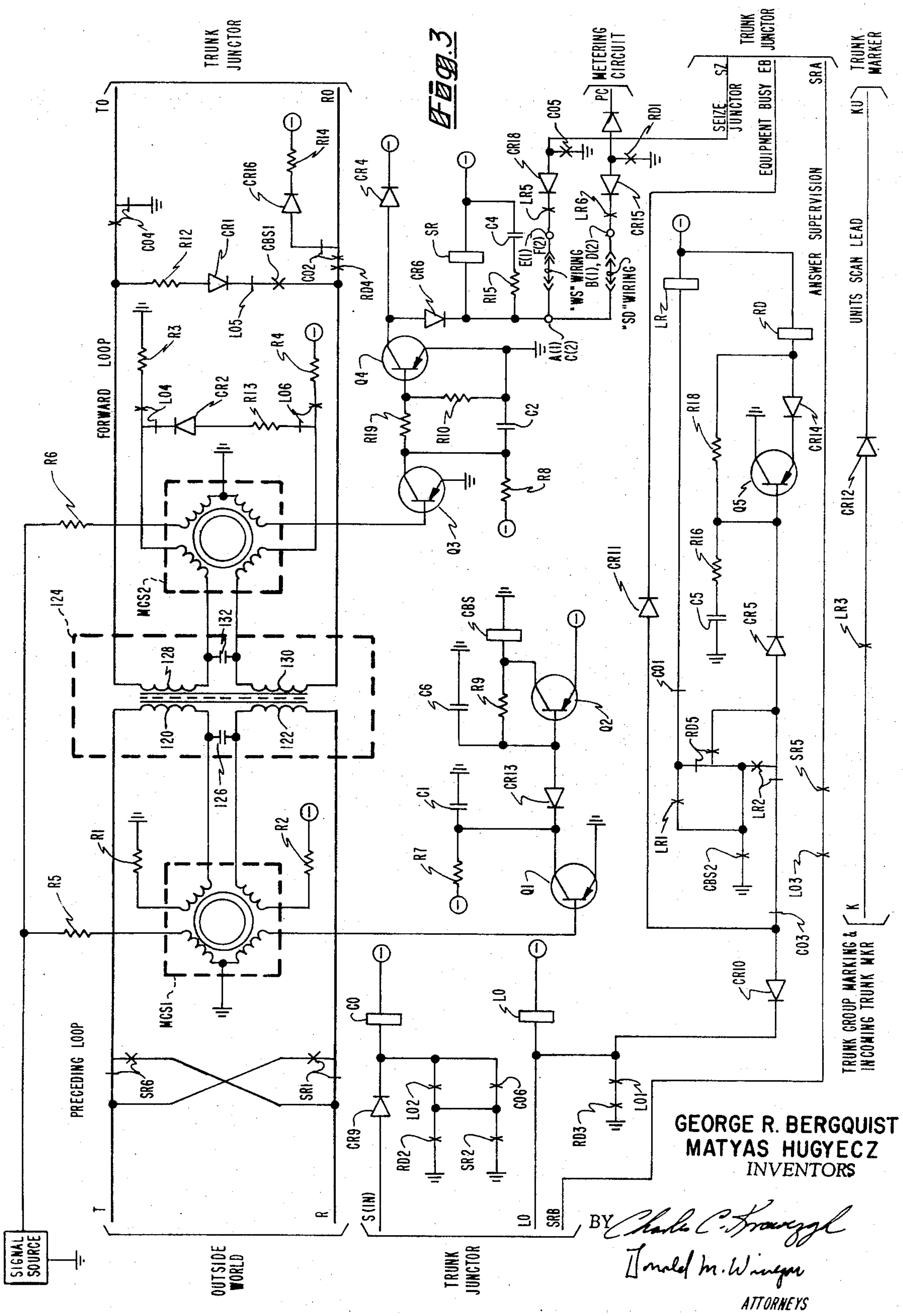
FIG. 3 is a schematic of an incoming trunk circuit, loop signalling type, suitable for use in the system of FIG. 1.

With reference to FIG. 3, in addition to FIG. 1, there is shown a schematic of an incoming trunk circuit loop-reverse battery type which functions as one of the incoming trunks 60 in the switching system of FIG. 1. The incoming trunk circuit provides an access to the telephone switching equipment of FIG. 1 from an outside world telephone circuit such, for example, as a trunk circuit or a line circuit, via a physical loop circuit. The incoming trunk circuit includes a preceding loop which is associated with a particular outside world telephone circuit. The preceding loop includes the windings 120 and 122 of a repeat coil 124, a magnetic core sensor MCS1 and resistors R1 and R2. The incoming trunk circuit also includes a forward loop which is associated with a particular one of the plurality of trunk junctors 64. The forward loop includes the windings 128 and 130 of the repeat coil 124, a magnetic core sensor MCS2 and resistors R3 and R4.

The incoming trunk circuit is seized when an outside world trunk telephone circuit is connected to the tip (T) and ring (R) leads of the preceding loop. The connection of the outside world telephone circuit saturates the magnetic core sensor MCS1. The current flow to the normally operated transistor Q1 ceases and turns the transistor Q1 off. The transistor Q2 is turned on and operates a calling bridge slave relay CBS. The operated relay CBS actuates the contacts CBS1 and CBS2. The actuated contacts CBS1 prepare the forward loop to the associated trunk junctor 64 (FIG. 1). The actuated contacts CBS2 operate a locate register relay LR via contacts RD5 and CO1 and prepare the operate path to a release delay relay RD.

The operated relay LR actuates the contacts LR1, LR2, LR3, LR5 and LR6. The actuated contacts LR1 lock the relay LR to ground via contacts CBS2. The actuated contacts LR2 operate the relay RD via contacts CBS2. The actuated contacts LR3 close the circuit (lead KV) to the incoming trunk scanner-marker 62 (FIG. 1). The scanner-marker begins a search for the seized incoming trunk circuit 60. The scanner-marker after locating the trunk requesting service, signals the TSLN control to complete a connection between a trunk register 66 and the incoming trunk via the trunk junctor 64 and the TSLN 68.

The actuated contacts LR5 is of importance only if a "wink start" (WS wiring) option is included in the trunk circuit. The actuated contacts LR5 prepare a circuit to operate a supervisory relay SR. If, however, the trunk circuit includes a "stop dial" (SD wiring) option feature, then actuating the contacts LR6 prepares an operate path to the relay SR. Should neither of these options be included in the trunk circuit, the relay SR will only operate when the transistor Q4 is conductive.

The operated relay RD actuates the contacts RD1 through RD5. The actuated contacts RD1 operate the relay SR only if the optional feature of "stop dial" (SD wiring) is included in the circuit. Further, a ground signal is sent out on the metering circuit for traffic metering, etc. Preferably, one meter is provided per each line circuit rquiring message rate metering. The actuated contacts RD2 prepare a circuit to the local relay L0 to ground through contacts LO1 when operated. The actuated contacts RD4 prepare the forward loop to the associated junctor 64. The actuated contacts RD5 close a second path to ground (by passing contacts LR2) for the relay RD via the contacts CBS2.

When a connection is established between the incoming trunk and a trunk register 66, the trunk register acknowledges a completed connection by detecting a test battery and a ground (via contacts CO4 and CO2) on the respective ring and tip leads. A signal in the form of a ground is impressed on the sleeve lead S(in) by the connected register 66. The ground signal operates the cutoff relay CO which prevents a second seizure of the incoming trunk circuit while it is a working telephone connection. The operated relay CO actuates the contacts CO1 through CO6.

The actuated contacts CO2 and CO4 disconnect the (preseizure) resistance battery ground from the ring and tip leads and close the forward loop to the associated trunk junctor 64. The actuated contacts CO1 open the operate path to the relay LR. The relay LR releases removing the "stop dial" signal, provided the "SD wiring" option is included in the circuit. Upon removal of the "stop dial" signal, dial pulses may be transmitted via the outside world telephone circuit to the register 66. The actuated contacts CO3 open the operate path to the relay LO to prevent the relay LO from operating when the relay LR releases. The actuated contacts CO5 extend ground out on the seize junctor head SZ to the junctor 64 to hold the associated junctor 64 operative as long as the incoming trunk circuit loop-reverse battery is seized.

In addition, should the optional feature of a "wire start" (WS wiring) be included in the incoming trunk circuit instead of the "stop dial" option, a supervisory relay SR is operated actuating the contacts SR1, SR2, SR5 and SR6. The actuated contacts SR1 and SR6 reverse the battery potential from the circuit of the magnetic core sensor MCS1 to the calling party across the leads of the preceding loop. The actuated contacts SR2 lock the relay CO to ground via its own contacts CO6. The actuated contacts SR5 prepare to connect the answer supervisory lead SRA to the answer supervisory relay (not shown) in the associated trunk junctor 64. This connection is necessary should it be required to signal the remote calling party that the called party has answered later. After a preset time interval such, for example, as 100 milliseconds, a timing circuit including a capacitor C4 and resistor R15 causes the relay SR to release. The released relay SR reactuates the contacts SR1, SR2, SR5 and SR6. The battery potential from the core sensor MCS1 is again reversed across the leads of the preceding loop. Thus, this preset period of time of battery reversal is the "wink start" signal. The "wink start" signals the distant central office's register and sender to start sending its stored dial pulse information.

Dial pulses are received from the outside world circuit register-sender in the distant office and pulses the relay CBS. The dial pulses cause the core sensor MCS1 to become periodically saturated and unsaturated, thereby causing the transistors Q1 and Q2 to turn off and on and cause the relay CBS to pulse. The pulsing of the relay CBS repeats the dial pulses from the outside world telephone circuit on the forward loop of the incoming trunk circuit to the seized trunk register 66 via the contacts CBS1. Upon completion of the reception of the incoming dial pulses, the trunk register 66 (FIG. 1) is released.

If the code translator 52 has determined that the incoming call is to a local line circuit **32*a*–32*n*, a ground signal is sent by the trunk register 66 (prior to being released) via the local lead LO to operate the local relay LO. The operated relay LO actuates the contacts LO1 through LO6. The actuated contacts LO1 lock the relay LO to ground via the contacts RD3. The actuated contacts LO2 lock the relay CO to ground via the contacts RD2. The actuated contacts LO3 prepare to operate the answer supervision lead SRA to the answer supervisory relay in the trunk junctor 64. The actuated contacts LO4 and LO6 prepare the operate circuit to the magnetic core sensor MCS2, whereby the magnetic core sensor MCS2 will operate via the magnetic core sensor MCS1 and the repeat coil 124 to the answering signal of the called party going off hook. The actuated contacts LO5 remove a shunt including a resistor R12 and a diode CR1 from across the tip and ring leads of the forward loop. Ringing of the local called party is accomplished via the ringing circuits 34 and the LLN 30.**

When the local called party answers to the ringing signal by going off hook, the magnetic core sensor MCS2 is saturated and the normally operated transistor Q3 is turned off, thereby turning on the transistor Q4. The turning on of the transistor Q4 operates the relay SR. The operated relay SR actuates the contacts SR1, SR2, SR5 and SR6. The actuated contacts SR1 and SR6 reverse the battery potential from the circuit of the magnetic core MCS1 across the leads of the preceding loop to the calling party to provide an answer supervisory signal. Actuating the contacts SR2 provides an additional holding circuit to the relay CO via its own contacts CO6. Actuating the contacts SR5 extends an answer supervisory signal via the answer supervision lead SRA to the trunk junctor 64. This provision is incorporated in the trunk circuit if the calling party originated the call from a remote central office via several tandem trunks. Answer supervision may then be required to tell the originating central office that the call has been answered. This, of course, depends on the central office equipment providing the necessary telephone connection between the calling and called parties. The telephone connection is now completed between the calling and the called parties and telephonic communication may now take place between the two parties via the repeat coil 124 and capacitors 126 and 132.

Should the called party be connected to a more distant central office, the incoming trunk circuit 60 functions only as an interconnecting link to the still more distant central office. As before, the relay CBS is operated, however, in this instance, the relay LO is not operated because the code translator 52 will not impress a ground potential on the lead LO, and therefore, battery is not provided by the incoming trunk circuit for MCS2, but rather from the outgoing trunk 78 or distant office. An outgoing trunk 78 is seized and is connected via the TLN 54 and a trunk junctor 60 to the forward loop of the incoming trunk circuit. When the called party answers, reverse battery potential is impressed by the central office switching equipment of the called party across the tip and ring leads of the outgoing trunk 78. The reverse battery potential casues the relay SR of FIG. 3 (incoming trunk) to operate. The operated relay SR reverses the battery potential across the leads of the preceding loop to the callig party to provide an answer supervision signal. The telephone connection between the calling and called parties via the incoming trunk circuit 60 is now complete. Telephone communication between the calling and the called parties can now take place via repeat coils 124 and capacitors 126 and 132.

When the calling party goes on hook, and the called party remains off hook, the relay CBS releases. Upon releasing, the relay CBS removes the holding ground from the relay RD. After a predetermined interval of time such, for example, as approximately 200 milliseconds (as determined by the values of the resistor R16 and the capacitor C5), the relay RD releases. The released relay RD removes the ground to the relays CO and LO (if LO is operated) and both relays are released. The ring lead RO is also opened by contacts RD4 releasing relay SR. The seized incoming trunk 60 is now returned to an idle state condition. Therefore, the incoming trunk circuit of the invention provides a forced disconnect in the situation, thereby assuring the trunk circuit is properly and promptly released.

When the called party goes on hook, and the calling party remains off hook, the magnetic core sensor MCS2 becomes unsaturated and the relay SR is released. Upon releasing, the relay SR opens the holding circuit to the junctor supervisory relay in the associated trunk junctor 64 via contacts SR5 and restores reverse battery potential back to normal battery potential across the leads of the preceding loop to the calling party. After a disconnection occurs in the distant office, the magnetic core sensor MCS1 becomes unsaturated and releases the relay CBS. The relay CBS disconnects the relay RD and after a preset period of time, such for example, as approximately 200 milliseconds, the relay RD releases. The released relay RD removes the holding ground from the relays CO and LO (if LO is operated). The relays CO and LO are therefore released. The seized incoming trunk 60 is now returned to an idle state condition.

TWO-WAY TRUNK CIRCUIT — LOOP-REVERSE BATTERY TYPE

Figure 4:
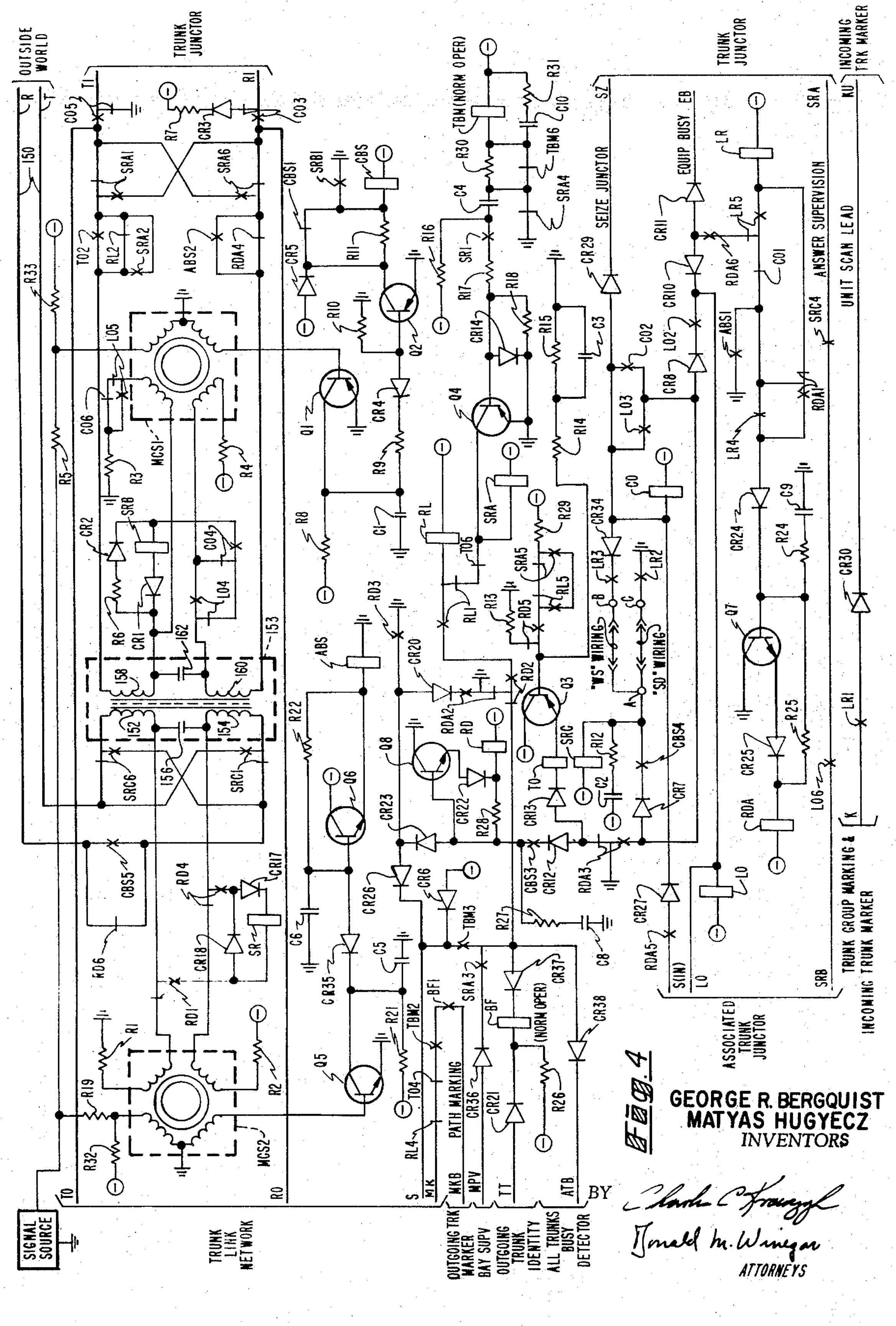
FIG. 4 is a schematic of a two-way trunk circuit, loop signalling type, suitable for use in the system of FIG. 1.

Referring now to FIG. 4, in addition to FIG. 1, there is shown a schematic diagram of a two-way trunk circuit-loop reverse battery type. This circuit functions as one of the two-way trunks 61 of FIG. 1. The two-way trunk circuits provide an outgoing access from the TLN 54 (FIG. 1) of the local central office to the telephone circuits of the outside world. Additionally, the trunk circuits 61 provide an incoming access from the outside world telephone circuits to the associated trunk junctors 64 of the local central office.

Each two-way trunk circuit includes a preceding loop, a forward loop and an outside world loop. The outside world loop includes a pair of leads 150, the windings 152 and 154 of a repeat coil 153, a magnetic core sensor MCS2 and resistors R1 and R2. The outside world loop provides an interface with a telephone circuit such, for example, as a turnk loop or a line loop of the outside world. The preceding (including tip and ring leads TO and RO) and forward (including tip and ring leads T1 and R1) loops include commonly shared windings 158 and 160 of the repeat coil 154, a magnetic core sensor MCS1 and resistors R3 and R4. The preceding loop provides an outgoing interface with the TLN 54. The forward loop provides an incoming interface with a particular one of the plurality of trunk junctors 64.

For an outgoing call, a load is connected across the tip and ring leads TO and RO of the preceding loop via the TLN 54 (FIG. 1). The connection of a load to the preceding loop of the two-way trunk circuit saturates the magnetic core sensor MCS1. The normally operated transistor Q1 is turned off which, in turn, turns on the transistor Q2 and operates a calling bridge slave relay CBS. The operated relay CBS actuates the contacts CBS1, CBS3, CBS4 and CBS5. The actuated contacts CBS1 open a short circuit across the resistor R11 to reduce the holding current to the relay CBS. The actuated contacts CBS3 operate a release delay relay RD. Actuating the contacts CBS 4 prepares an operate circuit to a supervisory relay SRC. Actuating the contacts CBS5 prepares the connection between the repeat coil 153 and the outside world by passing contacts RD6.

The operated relay RD actuates the contacts RD1, RD2, RD4, RD5 and RD6. Actuating the contacts RD1 and RD4 completes the loop to the outside world via MCS2 and applies battery to the outside world telephone circuit via the tip (T) and ring (R) leads 150. Actuating the contacts RD2 releases the normally operated busy-free relay BF actuating the contacts BF1. The normally operated relay BF helps to maintain the path marking lead MK-MKB closed when the trunk circuit is idle. The relay BF is maintained normally operated by ground via the closed contacts RDA2 and RD2. The actuated contacts BF1 open the mark lead to mark the trunk busy and to prevent a second seizure of the trunk circuit. Actuating the contacts RD5 via contacts RDA3 operates the time out relay TO.

The operated relay TO actuates the contacts TO2, TO4 and TO6. The actuated contacts TO6 open the circuit to the retain lead relay RL to make sure that the relay RL will not operate until the relay TO is released. This precaution is to achieve a sequence to maintain a bypass circuit around the contacts TO2 of the tip lead. The actuated contacts TO4 open the mark lead to the outgoing trunk marker 76 (FIG. 1). This action will assure that the two-way trunk circuit is held busy when time-out of the relay TO occurs (described in a later paragraph).

When the sender 80 originates dial pulsing, the dial pulsing causes the magnetic core sensor MCS1 to become alternately saturated and unsaturated. The alternate saturation and unsaturation of the core sensor MCS1 causes the relay CBS to pulse in response to the dial pulses. The pulsing relay CBS repeats the dial pulsing of the sender 80 on the tip and ring leads of the loop connected to the outside world telephone circuit via the contacts CBS5.

When the called party answers, a reversal of battery potential occurs in the outside world telephone circuit. This battery potential reversal is received on the tip and ring leads 150 from the seized outside world telephone trunk circuit and operates the supervisory relay SR. The operated relay SR actuates the contacts SR1. Actuating the contacts SR1 operates the supervisory relay-assist SRA.

The operated relay SRA actuates the contacts SRA1 through SRA6. The actuated contacts SRA1 and SRA6 repeat the battery potential reversal of the called party back to the calling party to provide an answer supervision signal. The battery potential reversal originates from the battery and the ground on the magnetic core sensor MCS1 through the operated contacts SRA1 and SRA6 back to the calling party. Actuating the contacts SRA2 closes a circuit in the tip lead to bypass the contacts TO2 and RL2 to maintain the tip lead operative during a subsequent operation sequence involving the relay TO to be described later. Actuating the contacts SRA3 closes a loop via contacts TBM3 (normally operative) from the meter pulse-voltage lead MPV to the sleeve (S) lead. This meter pulse-voltage lead is used for monitoring functions such, for example, as line message rate metering, or if prepay paystations are used, for generating a coin collect signal to the paystation adapter. Actuating the contacts SRA4 opens the hold circuit to the normally operated transmission battery monitoring relay TBM and the relay TBM releases. The relay TBM is normally operated via the contacts SRA4. However, the relay TBM is slow to release. This release time provides the actual duration that the meter pulse is applied for monitoring functions. During this period of release, a meter pulse such, for example, as 48 volts, is applied via the MPV lead on the sleeve (S) leads to the TLN 54 (FIG. 1). Actuating the contacts SRA5 initiate the time out of the relay TO. The telephone connection between the calling and the called parties is complete. Telephonic communication between the parties can now take place via the repeat coil 153 and capacitors 156 and 162. During telephonic communication between the calling and the called parties, the relay TO is "timed out" and releases. The relay TO, upon releasing, closes the contacts TO6 and operates the relay RL.

The operated relay RL actuates the contacts RL1, RL2, RL4 and RL5. The actuated contacts RL1 lock the relay RL to ground through the contacts RD2 and RDA2. Actuating the contacts RL2 opens a bypass circuit across the open contacts TO2 of the tip lead T1. However, the tip lead is maintained in a closed circuit condition by the bypass ciruit which includes the actuated contacts SRA2. The actuated contacts RL4 open the path marking circuit to assure one that the trunk circuits will remain in a busy condition. Actuating the contacts RL5 reoperates the relay TO to reactivate the "time out" circuit. The relay TO is reoperated in order to re-establish the time out feature of the relay TO in the telephone connection again. The completed telephone connection continues to be held between the calling and the called parties.

When the calling party goes on hook, the magnetic core sensor MCS1 becomes unsaturated. Transformer action of the core sensor MCS1 is initiated and the resulting current flow turns on the transistor Q1. The turning on of the transistor Q1 turns off the transistor Q2 and releases the relay CBS. Releasing the relay CBS causes the relay RD to release. The released relay RD opens (RD1 and RD4) the outside world telephone circuit, thereby releasing the circuit. The releasing of the outside world telephone circuit releases the relay SR. The released relay SR releases the relay SRA. In addition, when the relay RD releases, the relay BF is reoperated to its normally operated state and the relay RL is released. The released relay RL reoperates the relay TBM to its normally operated state. The seized two-way trunk loop-reverse battery type is now returned to its idle state condition. The path marking lead is now closed and awaits the next seizure of the trunk circuit for a call.

When the called party releases first, the relays SR and SRA are released. However, should the calling party remain off hook, the relay TO begins to "time out" via its associated "time out" circuit including a capacitor C3 and resistors R14 and R15. After a preset period such, for example, as approximately 20 seconds, the relay TO releases. Since relay RL is still operated, a disconnection of the calling party is found. The relay RD is slow to release as a result of an RC network including a capacitor C8 and a resistor R27. When relay RD releases, the relay RL releases and the relay TBM is reoperated to its normally operated state. The seized two-way trunk loop-reverse battery is now returned to an idle state condition.

For an incoming call to a central office having the two-way trunk circuit loop-reverse battery type 61 of this invention, a telephone circuit from the outside world is connected to the circuit via the leads 150. The magnetic core sensor MCS2 is saturated. Upon saturation, transformer action occurs within the magnetic core sensor MCS2 and the normally operated transistor Q5 is turned off. The turning off of the transistor Q5 turns on the transistor Q6 and operates the answer bridge relay ABS. The operated relay ABS actuates the contacts ABS1 and ABS2. Actuating the contacts AS1 operates the locate register relay LR via contacts RDA1. Additionally, an operate circuit to the release delay assist relay RDA is prepared by contacts ABS1. The actuating of the contacts ABS2 prepares the connection of the foward loop to the particular associated trunk junctor 64 (FIG. 1).

The operated relay LR actuates the contacts LR1 through LR5. Actuating the contacts LR1 closes a circuit (via leads K and KU) to the incoming trunk scanner-marker 62 (FIG. 1). The scanner-marker begins to search for the seized two-way trunk circuit loop-reverse battery type 61 requesting service. The actuated contacts LR2 are of importance only if an optional feature of incorporating a "stop dial" (SD wiring) signal feature is present in the circuit. If the "stop dial" option is present, the actuated contacts LR2 operate a supervisory backup relay SRC via the optional SD wiring between the terminals A and C. If, however, a "wink start" (WS wiring) feature is employed in the circuit, the actuated contacts LR3 prepare a circuit via the WS wiring between the terminals A and B to operate the relay SRC. The actuated contacts LR4 operate a release delay assist relay RDA. Actuating the contacts LR5 locks the relay LR to ground thruogh the contacts CO1 and ABS1.

The operated relay RDA actuates the contacts RDA-1 through RDA-6. The actuated contacts RDA-1 locks the relay RDA to ground via the contacts ABS1. Actuating the contacts RDA2 releases the normally operated busy-free relay BF. The released relay BF actuates the contacts BF1 to open the marking path lead MK and MKB to the TLN 54 and signals to trunk circuit is busy. The relay BF is held normally operated through the contacts RDA2. Actuating the contacts RDA3 removes ground from the relay RD to prevent the relay RD from inadvertently operating on another incoming call. This prevents a second calling party from inadvertently being connected to the circuit. Additionally, the actuated contacts RDA3 prepare a holding ground circuit to the relay SRC via contacts CO2 or LO3. Further, the actuated contacts RDA3 prepare a circuit to lock the relay LO to ground through its own contacts LO2 as well as preparing an operate circuit to the relay SR1. Actuating the contacts RDA4 opens the ring lead therethrough and places the ring lead of the forward loop in control of the contacts ABS2 of relay ABS. The relay ABS is a pulsing relay. Any pulsing of the relay ABS will be repeated on the ring lead via the contacts ABS2. Actuating the contacts RDA5 also prepares an operate path to the cutoff relay CO via the sleeve lead S(in), as well as also preparing an operate path to the local relay LO via contacts CO2. Actuating the contacts RDA6 connects an equipment busy circuit (not shown) in the associate trunk junctor 64 into the two-way trunk circuit loop-reverse battery type 61. If a register 66 (FIG. 1) is not attached and the relay ABS starts pulsing, an equipment busy signal will be sent to the calling party. The equipment busy signal signals the calling party that the line is busy and the calling party must originate his call again.

When connected to the trunk register, the register detects the test battery and the ground on the respective tip and ring leads of the trunk circuit via contacts CO5 and CO3. After the tip and ring check, a signal in the form of a ground is impressed on the sleeve lead S(in) from the connected register 66 which operates the relay CO. The operated relay CO actuates the contacts CO1 through CO6.

The actuated contacts CO1 release a lead retaining relay LR. The released relay LR actuates the contacts LR2 which removes the "stop dial" (SD wiring) signal to the outside world. This operation sequence occurs only if the "stop dial" feature is incorporated in the system. The removal of the "stop dial" signal signals the outside world that the trunk register is ready to receive dial pulse information.

Should the optional feature of "wink start" (WS wiring) be incorporated in the system instead of the "stop dial" option, the relay SR is operated by the action of relays CO and LR when ground is impressed on the sleeve lead S(in) by the connected trunk register 66. The operated relay SRC actuates the contacts SRC1, SRC4 and SRC6.

The actuated contacts SRC1 and SRC6 reverse the battery potential from the circuit of the magnetic core sensor MCS2 to the outside world calling party. Actuating the contacts SRC4 readies the answer supervision lead SRA for operating the answer supervisory relay (not shown) in the trunk junctor 64. After a preset interval of time such, for example, as approximately 100 milliseconds, a timing circuit, including a capacitor C2 and a resistor R12, cause the relay SRC to release, thereby reactuating the contacts SRC1, SRC4 and SRC6. Battery reversal again occurs on the leads 150 to the outside world. This preset interval of time is the "wink start" signal which signals the outside world register to start sending its stored dial pulse information.

Actuating the contacts CO2 extend ground via RDA3 out on the seize junctor SZ lead to the junctor 64 to hold the associated junctor 64 as long as the two-way trunk circuit is seized. In addition, actuating the contacts CO2 locks the relay CO to ground through the contacts RDA3. The forward loop is now connected to the trunk junctor via contacts CO3 and CO5. The actuated contacts CO3 and CO5 also remove the test battery and ground from the tip and ring leads T1 and R1. Actuating the contacts CO4 removes the magnetic core sensor MCS1 from the tip and ring leads of the forward loop and connects the supervisory backup relay SRB across the tip and ring leads of the forward loop. The relay SRB does not operate at this time since the current flow in the associated diode CR2 is opposite to that needed to operate the relay SRB. Actuating the contacts CO6 opens the circuit from the magnetic core sensor MCS1 to ground.

The pulsing of the distant register periodically saturates the magnetic core MCS2 causing the transistor Q5 to pulse off and on. The turning off and on of the transistor Q5 turns the transistor Q6 on and off, respectively, thereby operating the relay ABS in a pulsing manner. The operated relay ABS actuates the contacts ABS1 and ABS2. The actuated contacts ABS2 extends the pulsing forward via the associated trunk junctor 64 to the connected trunk register 66 in the local office. Actuating the contacts ABS1 tends to pulse the relay RDA. However, an R-C circuit including a capacitor C9 and a resistor R24 prevents the pulsing of the relay RDA and maintains the continuity of the telephone connection without interference. As noted previously, should the distant register initiate pulsing prior to connecting the trunk register 66 in the local office to the two-way trunk circuit, the relay CO will not operate as mentioned. Instead, a ground is forwarded on the equipment busy lead EB to the trunk junctor 64 to initiate an equipment busy signal back to the calling party.

After all the digits have been received by the local trunk register 66, and if the code translator 52 determines that the incoming call is to a local telephone subscriber, a ground signal is sent by the local register 38 on the local lead LO and operates the locak relay LO. The operated relay LO actuates the contacts LO2 through LO6. The actuated contacts LO3 lock the relay LO to ground through the contacts RDA3. Actuating the contacts LO3 provides an additional operating path for the relay CO. Actuating the contacts LO4 and LO5, prepares an operate circuit to the magnetic core sensor MCS1. The magnetic core sensor MCS1 will now operate when the called party answers. The actuated contacts LO6 prepare the circuit to the answer supervisory relay (not shown) in the trunk junctor 64 via the answer supervision lead SRA. Ringing of the local called party is accomplished via the ringing circuits 34 and the LLN 30.

When the local called party answers, the magnetic core sensor MCS1 is saturated. The flow of current to the transistor Q1 ceases. The transistor Q1 is turned off, thereby turning on the transistor Q2 and operating the calling bridge slave relay CBS. The operated relay CBS actuates the contacts CBS1, CBS3, CBS4 and CBS5. The actuated contacts CBS1 open a short circuit across the resistor R11 to reduce the relay holding current. The actuated contacts CBS3 prepare a circuit between a time out relay TO and its timing circuit. The actuated contacts CBS4 operates a supervisory connecting relay SRC. Actuating the contacts CBS5 closes a bypass around contacts RD6.

The operated relay SRC actuates the contacts SRC1, SRC4 and SRC6. The actuated contacts SRC1 and SRC6 provide a reverse battery potential signal to the outside world calling party for supervisory functions as necessary such, for example, as collecting coins in a pay telephone station. Actuating the contacts SRC4 provide an answer supervisory signal to the turnk junctor 64 and operates the supervisory relay therein (not shown). Further, the actuated contacts SRC4 prepares a time out circuit in the trunk junctor 64 to forcibly disconnect the calling party should the called party go on hook and the calling party remains off hook. The actuated contacts SRC4 also forwards ground on the sleeve lead S to the trunk junctor 64 and the trunk junctor reverses the battery potential therein.

If, however, the called party is not local and the two-way trunk circuit-loop-reverse battery type 61 is only an interconnection to a still more distant central office from that of the calling party, the relay LO is not operated. Instead, a second two-way trunk circuit-loop-reverse battery 61 or an outgoing trunk circuit-loop-reverse battery type 78 is connected to the first seized two-way trunk circuit 61 to provide a tandem connection to the still more distant outside world central office. When the called party in the still more distant outside world central office answers, reverse battery potential is impressed by the called party on the two-way trunk circuit-loop-reverse battery 61 connected thereto and operates the supervisory relay backup relay SRB. This occurs since the non-operated relay LO has prevented the magnetic core sensor MCS1 from being connected into the circuit. The operated relay SRB actuates the contacts SRB1 and operates the relay CBS. The operated relay CBS functions in the same manner as previously described for a local called party answering. In each instance when the relay CBS has operated, the telephone connection is now complete and telephony communication can now take place between the calling and called parties.

When the calling party goes on hook, and the called party is still of hook, the relay ABS releases. When released, the relay ABS opens the circuit to the relay RDA. The release of the relay ABS also opens the contacts ABS2 in the forward loop of the two-way trunk circuit-loop-reverse battery type 61. After a preset period of time such, for example, as approximatey 100 milliseconds, as determined by the values of the resistor R24 and the capacitor C1, the relay RDA releases. The released relay RDA releases the relays CO, LO (if operated), and SRC. The seized two-way trunk loop 61 is now returned to an idle trunk condition. The path marking lead is closed to enable the scanner-marker 62 to detect the idle trunk circuit when it requests service.

When the called party goes on hook, and the calling party remains off hook, the associated relay CBS (local call) or SRB (more distant outside world central office call) releases. The released relay SRB releases the relay CBS.

The released relay CBS releases the relay SRC. The released relay SRC restores the reverse battery potential to normal battery potential back to the outside world calling party and opens the answer supervision lead SRA. The answer supervision relay (not shown) in the associated trunk junctor 64 is released. The calling party receives a busy signal after a preset period of time such, for example, as approximatey 20–30 seconds, as controlled by the associated trunk junctor 64, after the called party has gone on hook. The released relay ABS starts a timing out of the relay RDA. After a preset interval of time such, for example, as approximately 200 milliseconds, the relay RDA releases. The released relay RDA removes the holding ground from the relays CO and LO (if operated) thereby releasing them. The seized trunk circuit is now returned to an idle state condition.

OUTGOING TRUNK CIRCUIT – E AND M

Figure 5:
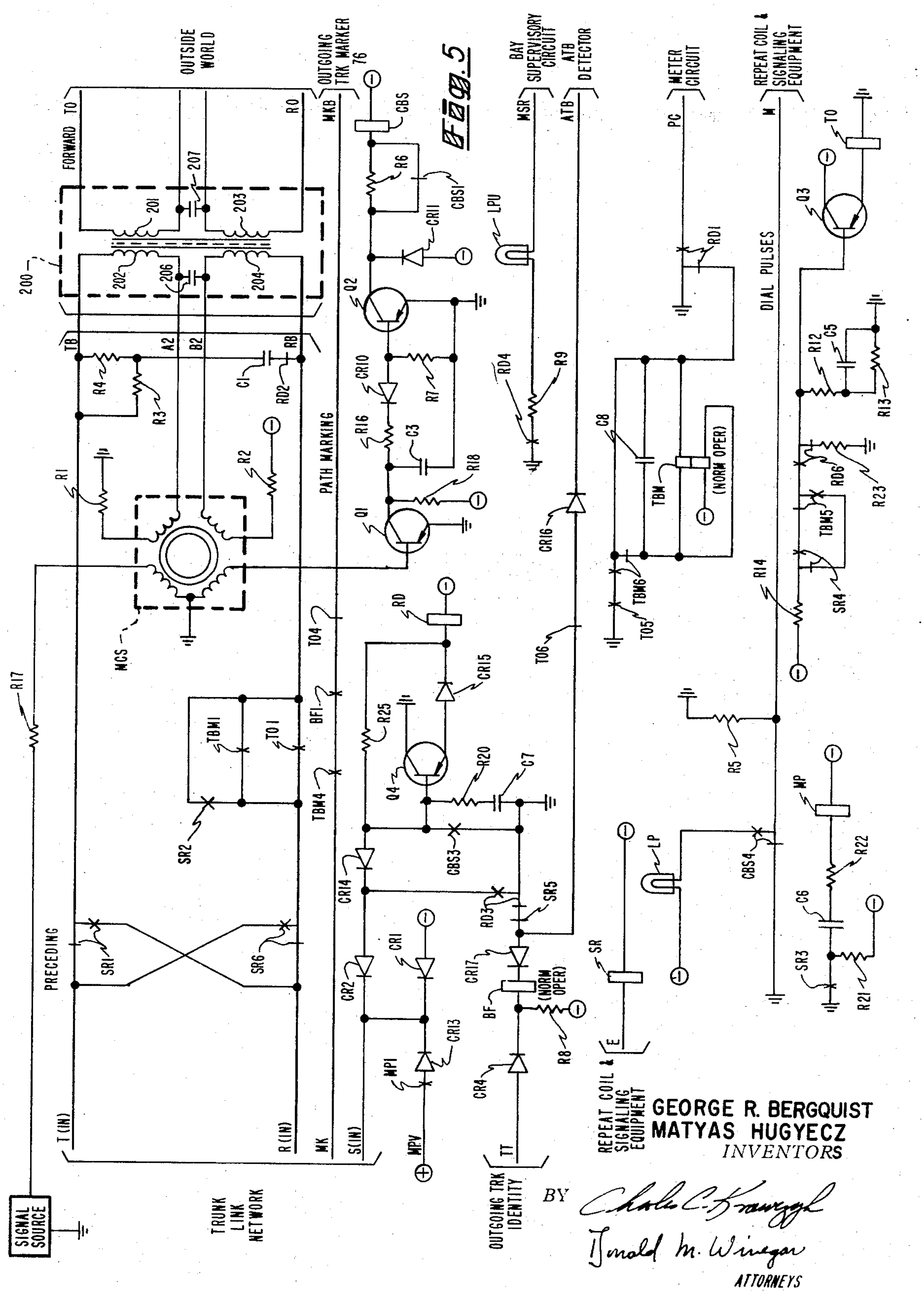
FIG. 5 is a schematic of an outgoing trunk circuit, E and M signalling type, suitable for use in the system of FIG. 1.

Referring now to FIGS. 1 and 5, there is hown a schematic of an outgoing trunk circuit – E and M type, suitable for functioning as an outgoing trunk circuit 78 of the system of FIG. 1. The circuit 78 is employed with a telephone system embodying signalling equipment, such, for example, as a carrier system. The circuit 78 includes a preceding loop and a forward loop. The preceding loop is associated with a particular portion of the TLN 54 and includes the tip [T(in)] and ring [R(in)] leads and windings 202 and 204 of the repeat coil 200, the magnetic core sensor MCS and resistors R1 and R2. The forward loop is associated with windings 201 and 203 of the remote repeat coil 204 and signalling equipment associated with a particular outside world telephone circuit and includes a continuation of the leads TO and RO.

The outgoing trunk circuit — E and M type 78 is seized for an outgoing call from the local central office when a loop of a local subscriber's line circuit or load of an outside world telephone circuit is connected by the TLN 54 across the tip and ring leads T(in) and R(in) of the circuit 78. The connected load causes the magnetic core sensor MCS to become saturated. Upon saturation, the transformer action of the magnetic core sensor ceases, turning off the normally operated transistor Q1. The turning off of the transistor Q1 turns on the transistor Q2 and operates the calling bridge relay CBS.

The operated relay CBS actuates the contacts CBS1, CBS3 and CBS4. Actuating the contacts CBS1 opens a short circuit across the resistor R6 to reduce the holding current to the relay CBS. Actuating the contacts CBS3 operates the release delay relay RD via transistor Q4. Actuating the contacts CBS4 extends the resistance battery via the resistance lamp LP out on the signal lead "M" and seizes the associated outside world distant telephone circuit by operation of a relay (not shown) actuated by the outside world telephone circuit's associated signalling equipment.

The operated relay RD actuates the contacts RD1, RD2, RD3, RD4 and RD6. The actuated contacts RD1 extends ground on the peg meter circuit lead PC to a traffic meter for monitoring the traffic of the trunk circuit 78 and opens the circuit to the normally operated relay TBM. The relay TBM remains operative because of a charged capacitor C8 which begins to discharge. The discharge period of the capacitor C8 is greater than the elapse time necessary for the actuated contacts RD6 to operate a time out relay TO and actuate the contacts TO5. The actuated contacts RD2 removes an idle line termination circuit from across the tip and ring leads TB and RB. The idle line termination circuit is necessary to falsely terminate the signalling system associated with the circuit 78 to prevent singing of the signal equipment when the circuit 78 is idle. Any singing of the signalling equipment might induce noise into adjacent telephone circuits. Actuating the contacts RD3 releases the normally operated busy-free relay BF actuating the contacts BF1. The actuated contacts BF1 open the mark lead MK-MKB to the outgoing trunk marker 76 (FIG. 1) to mark the trunk busy. This prevents a second seizure of the circuit 78 while the circuit is in use. Actuating the contacts RD4 lights the in use lamp LPV to visually indicate that the trunk circuit is in use. In addition, the actuated contacts RD4 remove ground from the "all trunks busy" lead (ATB) to the all trunks busy detector (not shown). The all trunks busy detector operates in the same manner as previously described.

The operated relay TO actuates the contacts TO1, TO4, TO5 and TO6. Actuating the contacts TO1 closes a bypass circuit around the contacts TBM1 and SR2 in the ring lead of the circuit 78. The actuated contacts TO4 open the path marking lead MK-MKB to the outgoing trunk marker 76. This provides an added assurance that the circuit 78 will not be seized a second time while still in use. The actuated contacts TO5, as stated before, close an operate path to the relay TBM to keep the relay TBM operative. Actuating the contacts TO6 opens the all trunks busy lead ATB to the ATB detector to prevent the lead ATB from sending a ground signal to the all trunk busy detector if the relay RD is released inadvertently.

Outpulsing of the trunk register 66 is sent by the sender 80 and is repeated by the relay CBS via the contacts CBS4 and the lead "M" to the seized outside world trunk circuit.

When the called party answers by going off hook, resistance battery in the associated signalling equipment of the outside world telephone circuit is transmitted via the outside world lead "M" to the E lead of the trunk circuit 78 and operates a supervisory relay SR. The operated relay SR actuates the contacts SR1, SR2, SR3, SR4 and SR6. Actuating the contacts SR1 and SR6 reverses the battery potential on the tip and ring leads T(in) and R(in) of the preceding loop to provide an answer supervision signal to the calling party. The actuated contacts SR2 close a bypass in the ring lead around the contacts TO1 and TBM1 to maintain the telephone connection when the relays TO and TBM are released and reoperated. Actuating the contacts SR3 operates the meter pulse relay MP. The relay MP remains operative for a preset interval of time such, for example, as for approximatey 50–70 milliseconds. The preset interval of time is determined by the RC circuit which includes resistors R21 and R22 and the capacitor C6. The operated relay MP actuates the contacts MP1 providing a +48 voltage pulse out on the sleeve lead S(in). The +48 volt pulse is used for supervisory functions such, for example, as to actuate a coin collect relay in a prepay station adapter as required. Actuating the contacts SR4 releases the relay TO. The relay TO begins to time-out in a preset interval of time such, for example, as in approximately 20 seconds. The preset interval of time is determined by the RC circuit which includes resistors R12 and R13 and a capacitor C5.

The relay TO releases after the preset time-out period has expired and reactuates the contacts TO1, TO4, TO5 and TO6. Reactuating the contacts TO1 opens a bypass circuit around the contacts TBM1 and SR2 of the ring lead. The telephone connection is maintained by the contacts SR2 (as the contacts TBM1 open when the contacts TO5 are reactuated) which provide a continuity in the ring lead. Reactuating the contacts TO4 prepares to close the path marking lead MK-MKB between the TLN 54 and the outgoing trunk marker 76. Reactuating the contacts TO5 releases the relay TBM. The reactuated contacts TO6 prepare the lead TBM to the all trunk busy (ATB) detector for operation. No signal is sent at this time as the contacts RD3 are actuated.

The released relay TBM reactuates the contacts TBM1, TBM4, TBM5 and TBM6. Reactuating the contacts TBM1 opens the bypass circuit around the contacts TO1 in the ring lead R(in)-RB. However, the contacts SR2 maintain the telephone connection. The reactuated contacts TBM4 open the path marking lead MK-MKB to the outgoing trunk marker 76 (FIG. 1). The reactuated contacts TBM5 reoperate the relay TO, thereby reactuating the TO contacts in the same manner as heretofore described. The relay TO is now reset for timing out at the close of the telephone conversation, if time out is required. Reactuating the contacts TBM6 retains the relay TBM inoperative via contacts TO5.

The telephone connection is now established. Telephone communication is now possible between the calling and the called parties via the repeat coil 200 and capacitors 206 and 207.

When the calling party goes on hook first and the called party remains off hook, the relays CBS and RD are sequentially released. Upon releasing, the relay CBS removes the resistance battery impressed on the lead M, thereby providing a disconnect signal to the seized outside world telepone circuit. Upon release of the outside world telephone circuit, the relay SR releases. The released relay RD releases the relay TO and reconnects the idle line termination circuit including a resistor R4 and a capacitor C1 across the leads TB and RB of the forward loop. The timing out of the relay TO is not significant in this instance. The trunk circuit is returned to an idle state condition.

When the called party goes on hook first, the relay SR releases. If the calling party does not hang up, the relay TO will release after a preset period of time such, for example, as after approximately 20 to 30 seconds. Upon releasing, the relay TO opens the ring lead R(in), unsaturating the core MCS and thereby releasing the relay CBS. The released relay CBS releases the relay RD and removes the resistance battery from the signal lead M to the associated outside world telephone circuit. The relay RD releases after an approximate 200 millisecond release delay and ground is removed from the sleeve lead S(in) restoring the crosspoints of the TLN 54 to a normal condition and the relays TBM and BF to their normally operated state. In addition, the idle line termination is reconnected across the tip and ring leads. The trunk circuit is now in its idle state condition.

INCOMING TRUNK CIRCUIT — E AND M SIGNALLING

Figure 6:
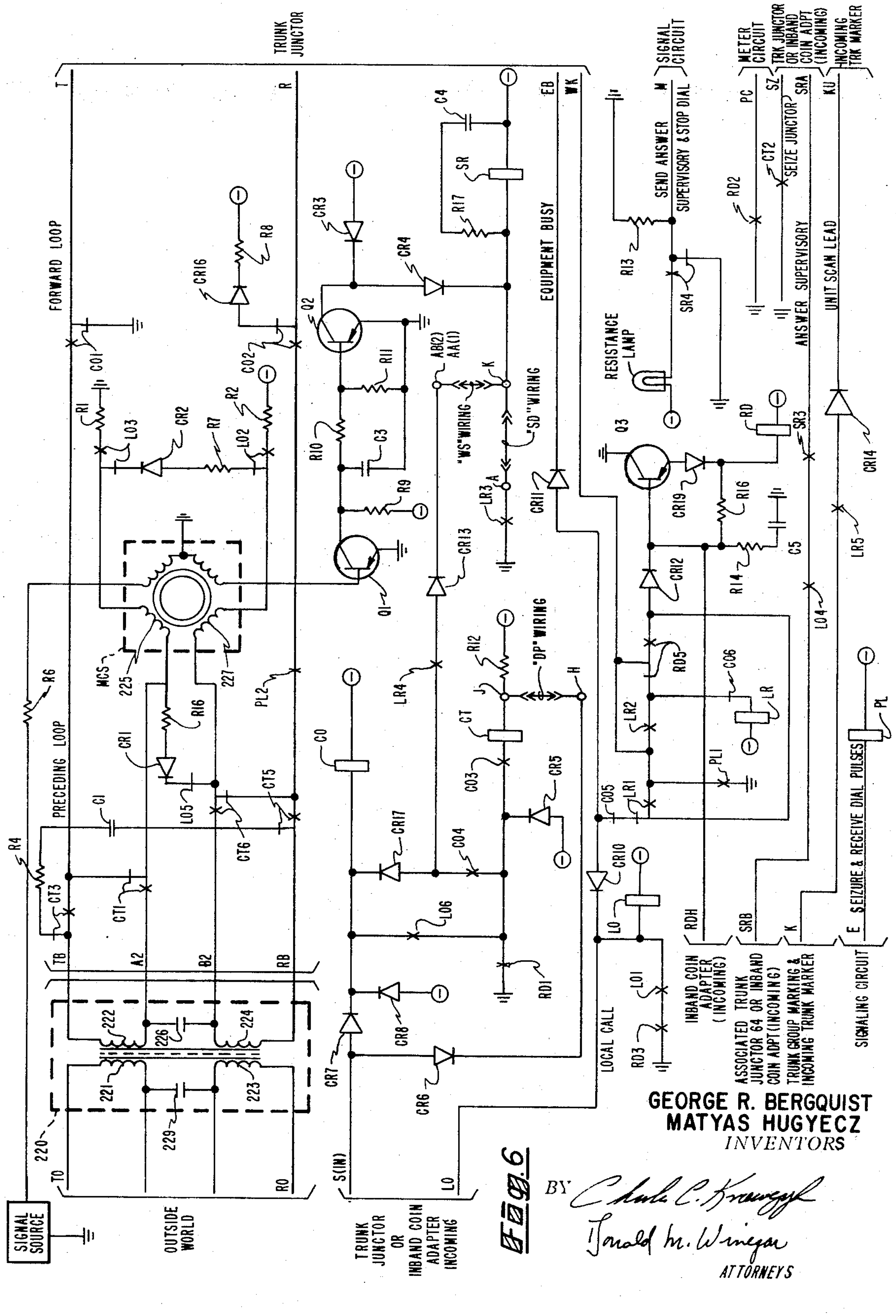
FIG. 6 is a schematic of an incoming trunk circuit, E and M signalling type, suitable for use in the system of FIG. 1.

Referring now to FIG. 6, in addition to FIG. 1, there is shown a schematic of an incoming trunk circuit — E and M type, suitable for use as an incoming trunk circuit 60 in the telephone switching system of FIG. 1. The circuit 60 is employed with an electronic switching system central office utilizing signalling equipment. The circuit 60 includes a preceding loop and a forward loop. The preceding loop is associated with a loop of the outside telephone circuit which includes winding 221 and 223 of repeat coil 220. The forward loop includes coils 222 and 224 of the repeat coil 220, windings 225 and 227 of a magnetic core sensor MCS, and resistors R1 and R2. An idle line termination circuit including a resistor R4 and a capacitor C1 is connected across the tip and ring leads TB and RB.

For an incoming call from an outside world telepone circuit, a ground signal is impressed on the E lead of the incoming trunk circuit 60 in response to a signal from the signalling equipment associated with the outside world telepone circuit. The ground on the lead E operates a pulse repeating relay PL. The operated relay PL actuates the contacts PL1 and PL2. The actuated contacts PL1 operate the locate register relay LR via contacts RD5. The actuated contacts PL2 prepare the forward loop to be connected to the particular associated junctor 64.

The operated relay LR actuates the contacts LR1 through LR5. Actuating the contacts LR1 operates the release delay relay RD via transistor Q3. Actuating the contacts LR2 locks the relay LR through its own contacts to the PL1 ground. The actuated contacts LR3 operate the supervisory relay SR provided the optional feature of "stop dial" is included in the circuit wherein the operation of the relay SR actuates the contacts SR4. The actuated contacts SR4 enable a "stop dial" signal, a negative potential, to be transmitted via the resistive lamp LP over the signalling circuit lead M via the associated signalling equipment to the outside world telephone circuit. The "stop dial" signal tells the register attached to the outside world telephone circuit to hold back the sending of dial pulses until a trunk register 66 is attached to the incoming trunk circuit 60 in the local central office.

If, however, an optional feature of "wink start" (WS wiring) is provided in the circuit in place of the "stop dial" feature, the actuating of the contacts LR4 prepares an operate path to the relay SR. Actuating the contacts LR5 signals the incoming scanner-marker 62 (FIG. 1). The scanner-marker 62 begins a scanning operation to locate the incoming trunk 60 seeking service and to mark it.

When the TSLN control 70 (FIG. 1) locates a path between the seized trunk junctor 64 (FIG. 1) and a free trunk register 66 (FIG. 1) which is identified and marked, a connection between the seized trunk junctor 64 and the located free trunk register 66 is completed. The metallic connection through the tip and ring leads is checked, and the sleeve connections are completed. The completion of the sleeve connections allows a ground potential to be impressed on the sleeve lead S(in) and operate a cutoff relay CO, as well as a release delay relay in the trunk junctor 64 (not shown).

The operated relay CO actuates the contacts CO1 through CO6. Actuating the contacts CO1 and CO2 removes the preseizure battery and ground from the tip (T1) and ring (R1) leads of the forward loop and connects the tip and ring leads TB and RB to the associated trunk junctor 64 (FIG. 1) to close a telephone loop circuit therebetween. The actuated contacts CO3 operate a cut through relay CT via contacts RD1. However, if the circuit is employed with a multifrequency ringing option, the connection between the terminals J and H is closed (DP wiring) and the relay CT does not operate. Actuating the contacts CO4 locks the relay CO to ground through the contacts RD1. The actuated contacts CO5 open the circuit from the relay LR to the equipment busy lead EB. Actuating the contacts CO6 releases the relay LR and removes the "stop dial" signal, provided the "stop dial" option is included in the circuit, to the trunk register associated with the outside world telephone loop.

If the optional "wink start" feature is included in the trunk circuit, a reverse battery potential from the register of the distant central office is detected on the tip and ring leads T1 and R1 and operates the relay SR via the core MCS. The relay SR is operated when the reverse battery causes the magnetic core sensor MCS to become saturated, turning the transistor Q1 off. The turning off of the transistor Q1 turns the transistor Q2 on and operates the relay SR. The operated relay SR actuates the contacts SR3 and SR4. Actuating the contacts SR3 prepares a circuit to connect the answer supervisory lead SRA to the answer supervisory lead relay (not shown) in the trunk junctor 64. Actuating the contacts SR4 signals the register (not shown) associated with the outside world telepone loop to prepare to start to send the stored dial pulses to the locally connected trunk register 66. After a preset interval of time such, for example, as approximately 100 milliseconds, as determined by the RC circuit including a resistor R11 and a capacitor C3, the relay SR is released. This is the completion of the "wink start" signal. The register and sender associated with the outside world telephone circuit now proceeds to send the stored dial pulses to the local trunk register 66. The incoming dial pulses are received on the signal lead E and the relay PL repeats the dial pulses to the local trunk register 66 via the contacts PL2 in the line RD-R1.

After all the dial pulses have been received, the local trunk register 66 is released. Ground is removed from the sleeve lead S(in) and operates the cut through relay CT, provided the optional DP wiring is provided in the circuit. Operating the relay CT actuates the contacts CT1, CT2, CT3, CT5 and CT6, Actuating the contacts CT1 and CT6 connects the core MCS to the coils 222 and 224 of the repeat coil 220. The actuated contacts CT3 and CT5 remove the idle line termination circuit from the tip and ring leads TB and RB. Actuating the contacts CT2 forwards ground on the seize junctor lead SZ to hold the relay (not shown) in the associated trunk junctor circuit 64 operated. The associated junctor 64 will remain seized until the termination of the telephone connection.

If the code translator 52 has determined that the incoming call is to a local subscriber telephone circuit, a ground signal is sent by the local register 38 on the local lead LO to operate the local relay LO. The operated relay LO actuates the contacts LO1 through LO6. Actuating the contacts LO1 locks the relay LO to ground through contacts RD3. Actuating the contacts LO2 and LO3 removes a circuit including a resistor R7 from across the leads A2 and B2 and provides the forward loop with local battery supervision. The actuated contacts LO4 prepare an answer supervision lead SRA to the answer supervisory relay in the associated trunk junctor 64. The contacts LO6 remove the diode CR2 and resistor R16 from across the leads A2 and B2 of the repeat coil and the magnetic core sensor (MCS). Actuating the contacts LO6 closes an additional path via RD1 to ground to retain the relay CO operative. Ringing of the local called party is accomplished via the ringing control circuits 34 and the LLN 30.

When the called party goes off hook, resistance battery is returned to the outside world. The magnetic core sensor MCS is saturated and operates the relay SR and completes the telephone connection. The calling and called parties can now converse with each other via repeat coil 220 and capacitors 225 and 229.

Should the code translator 52 determine that the called party is a trunk call to a more distant central office, and not to a local subscriber telephone circuit, the relay LO is not operated. An outgoing trunk circuit 78 or a two-way trunk circuit 61 is connected to the seized incoming trunk circuit 60 to connect the calling party to the more distant central office. When the called party in the more distant central office answers, reverse battery is impressed by the called party and operates the relay SR. The operated relay SR actuates the SR contacts in the same manner as described heretofore. The operation of the relay SR completes the telephone connection. The calling and called parties may now communicate with each other.

When the calling party goes on hook, the relay PL is released and removes the holding ground from the relay RD and the relay RD is released. The released relay RD releases the relays CO, CT and LO (if operated). Upon releasing, the relay PL opens the loop circuit to the magnetic core sensor MCS and releases the relay SR. The idle line termination (capacitor C1 and resistor R4) is reconnected across the tip and ring leads of the preceding loop. The seized trunk is released and reverts to an idle state condition.

When the called party goes on hook, the relay SR releases. Releasing the relay SR removes the resistance battery from the signal lead M, thereby providing a disconnect signal to the calling party of the outside world telephone loop. Ground is removed from the signal lead E by the signalling equipment of the circuit 60 and the outside world trunk circuit and the relay PL is released. The released relay PL releases the relays RD, CO and CT. The seized incoming trunk circuit 60 is returned to an idle state condition, including the idle line termination (capacitor C1 and resistor R4) reconnected across the tip and ring leads.

TWO-WAY TRUNK CIRCUIT — E AND M

Figure 7:
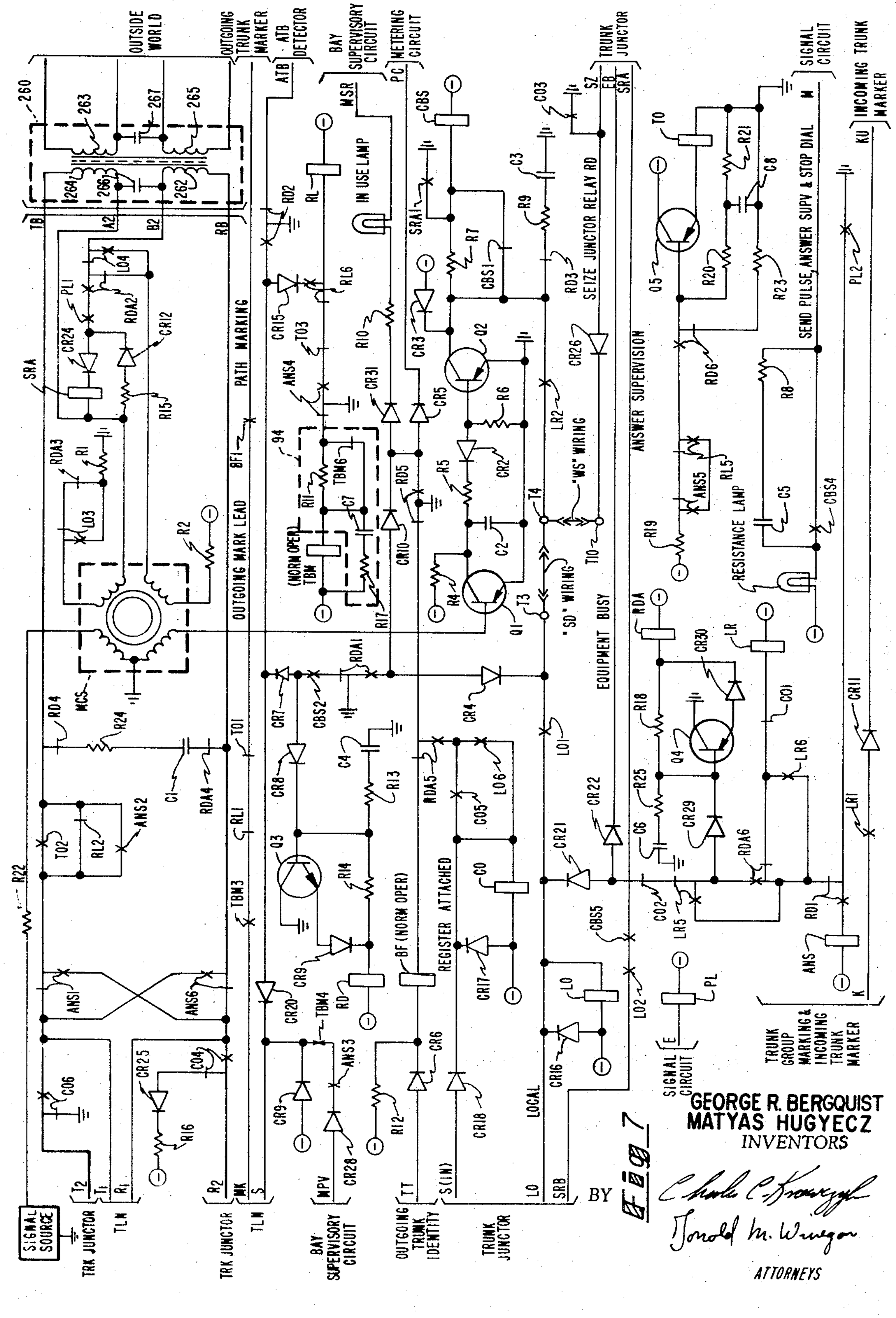
FIG. 7 is a schematic of a two-way trunk circuit, E and M signalling type, suitable for use in the system of FIG. 1.

Referring now to FIG. 7, in addition to FIG. 1, there is shown a schematic of a two-way trunk circuit — E and M, made in accordance with this invention. The two-way trunk circuit is suitable for use as one of the plurality of two-way trunk circuits 61 in the telephone switching system of FIG. 1. The circuit 61 functions as an outgoing access from the TLN 54 to the outside world. It also functions as an access from the outside world to the associated trunk junctor 64.

The two-way trunk circuit 61 includes a preceding loop and a forward loop. The preceding loop is associated with a particular portion of the TLN 54 and a particular one of the plurality of trunk junctors 64. The preceding loop includes windings 262 and 264 of the repeat coil 260 and the magnetic core sensor MCS including the resistors R1 and R2 or the circuit of the supervisory relay SR. The forward loop includes the windings 263 and 265 of the repeat coil 260. An idle line circuit including resistor 24 and capacitor C1 are connected across the tip and ring line via contacts RD4 and RDA4.

A two-way trunk circuit 61 is seized for an outgoing call from the local central office when a telephone loop of either a local subscriber's telephone circuit, an incoming trunk circuit 60, or another two-way trunk circuit 61 is connected by the TLN 54 (FIG. 1) to a selected one of a plurality of idle two-way trunk circuits 61 (FIG. 1). The telephone loop is connected to the tip and ring leads T1 and R1 causing the magnetic core sensor MCS to become saturated. Upon saturation of the magnetic core sensor, the transistor Q1 is turned off and causes the transistor Q2 to become conductive and operate the calling bridge relay CBS. The operated relay CBS actuates the contacts CBS1, CBS2, CBS4 and CBS5. The actuated contacts CBS1 open a short circuit around the resistor R7. The relay CBS is now held through the resistor R7 which reduces the holding current of the relay CBS and therefore protects the relay as well. The actuated contacts CBS2 close a circuit to ground through the contacts RDA1 to operate the release delay relay RD. The actuated contacts CBS4 close a circuit to extend the resistance battery through the resistive lamp to the signal lead M to actuate a signal circuit in the signal equipment associated with an outside world telephone circuit to seize that associated telephone circuit. The actuated contacts CBS5 prepare an answer supervisory lead SRA to operate the answer supervisory relay (not shown) in the associated trunk junctor 64.

The operated relay RD actuates the contacts RD1 through RD6. Actuating the contacts RD1 prepares an operate circuit to the answer relay ANS. The relay ANS does not operate at this time as no ground connection is present to the relay ANS. The actuated contacts RD2 applies ground on the sleeve lead S to the TLN 54. Actuating the contacts RD3 opens the circuit to an RC network including a resistor R9 and a capacitor C3 and removing the network from in series with the relay CBS. The RC network is a hold over delay circuit to the relay CBS and is associated with the wink start signal should such a signal be incorporated in the two-way trunk circuit. The relay CBS is now conditioned to repeat dial pulses to the outside world telephone connection. The actuated contacts RD4 remove an idle line termination including a resistor 24 and a capacitor C1 from across the tip and ring leads of the preceding loop. The actuated contacts RD5 releases the normally operated busy-free relay BF. The relay BF is held normally operated via the contacts RD5 and RDA5. The actuated contacts RD5 also lights the "in use" lamp for a visual identification that this particular one of the two-way trunk circuits is in use. The actuated contacts RD6 operate a time out relay T0.

The released relay BF opens the path marking lead MK-MKB between the TLN 54 (FIG. 1) and the outgoing trunk marker 76 (FIG. 1) busying the selected trunk lead in the junctor control 84 (FIG. 1). This prevents the trunk circuit from inadvertantly being seized a second time. The operated relay T0 actuates the contacts TO1, TO2 and TO3. Actuating the contacts TO1 also opens the outgoing mark lead MK-MKB between the TLN 54 and the outgoing trunk marker 76. This is an assurance to make sure that the trunk circuit is not seized a second time. The relay TO is a slower acting relay than the relay BF to permit this sequence of events. The actuated contacts TO2 close to bypass contacts RL2 and ANS2 in the tip lead T of the preceding loop connection. The actuated contacts TO3 open the circuit to the release relay RL. Therefore, if the contacts ANS4 are actuated, the relay RL will not operate.

Dial pulses are now outpulsed by the sender 80 from the trunk register 66 and repeated on the signal lead "M" by the pulsing of the relay CBS.

When the called party answers, the signal equipment of the outside world telephone circuit causes the signal equipment associated with the circuit 61 to impress a ground on the signal lead E. The ground on the lead E operates a pulsing relay PL. The operated relay PL actuates the contacts PL1 and PL2. The actuated contacts PL1 prepare to operate circuit of the supervisory assist relay SRA. The actuated contacts PL2 allows a ground to be impressed through the actuated contacts RD1 and operates the answer relay ANS.

The operated relay ANS actuates the contacts ANS1 through ANS6. Actuating the contacts ANS1 and ANS6 reverse the battery potential on the tip and ring leads of the preceding loop to provide an answer supervision signal to the calling party. Actuating the contacts ANS2 connects a bypass circuit around the contacts TO2 and RL2 in the tip lead to maintain the telephone connection when the relay TO subsequently is released. The actuated contacts ANS3 allows a ground pulse to be impressed on the meter pulse voltage lead MPV from the sleeve lead through the closed contacts TBM4 of the normally operated transmission battery monitor relay TBM until the relay TBM releases. The actuated contacts ANS4 release the relay TBM. The relay TBM releases after a preset period of time such, for example, as approximately 50 milliseconds.

The actuated contacts ANS5 remove the resistance battery from the base of the transistor Q5. The transistor Q5 is rendered non-conductive and shuts off the flow of current to the time out relay TO. The relay TO begins to time itself out. The timing circuit associated with the relay TO includes the transistor Q5 having the collector connected to battery, the emitter connected to the relay TO and the base connected to ground via two series connected resistors R20 and R21. The relay TO has one terminal connected to ground. A capacitor C8 is connected in parallel with the resistor R21 between the common junction of the resistors R20 and R21 to ground. A resistor R23 is connected through the normally closed contacts RD6 between the base of the transistor Q5 and ground.

After a preset time interval such, for example, as approximately 20 seconds, the relay TO will release. However, the telephone connection is not broken. When the relay ANS operated, the actuated contacts ANS4 impressed ground via the normally closed contacts TO3 and RL6 and operated the relay RL. The operated relay RL locked itself to ground through its own actuated contacts RL6 via the contacts RD2. In addition, the contacts RL6 open the circuit to the first ground that had operated the relay. The operated relay RL actuates the contacts RL5 and resistance battery is again applied to the base of the transistor Q5 and the relay TO is reoperated. The contacts TO1 through TO3 are reactuated in the same manner as previously described.

Acutating the contacts RL1 opens the outgoing mark lead MK-MKB between the TLN 54 and the outgoing trunk marker 76. The actuated contacts RL2 opens a bypass circuit across the contacts TO2 and ANS2 in the tip lead in the preceding loop. The opening of the tip lead T is now dependent on the operation of both of the relays ANS and TO.

The releasing of thd relay TBM actuates the contacts TBM3, TBM4 and TBM6. Actuating the contacts TBM3 opens the outgoing mark lead MK-MKB between the TLN 54 (FIG. 1) and the outgoing trunk marker 76 as another assurance that the selected two-way trunk circuit 61 will not be seized again. The actuated contacts TBM4 open the circuit of the meter pulse lead MPV terminating the ground sent to monitoring circuits. Actuating the contacts TBM6 opens a short circuit across the resistor R11 in a timing circuit 94 which also includes a resistor R17 and a capacitor C7, connected to the relay TBM. This reduces the holding current for the relay TBM.

The telephone connection is now complete between the calling party and the called party. The transmission of telephony communication may now take place via the repeat coil 260 and capacitors 266 and 277.

When the calling party goes on hook first, the magnetic core sensor MCS becomes unsaturated. The transistor Q1 is rendered conductive and the transistor Q2 is turned off causing the relay CBS to release. The release of the relay CBS opens contacts CBS4 and removes the resistance battery from the signal lead "M" providing a disconnect signal to the seized remote telephone loop (not shown) and opens contact CBS2 to release the relay RD.

The released relay RD releases the relays TO, RL and ANS. The release of the relay RD also reconnects the RC network including resistor R9 and capacitor C3 to the relay CBS and reconnects the idle line termination (resistor 24 and capacitor C1) across the tip and ring leads. The idle line termination is to minimize the possibility of the carrier equipment singing in the idle trunk circuit and causing noise in nearby trunk circuits. In addition, ground is removed from the in use lamp LP1 turning the lamp off to visually signal that the two-way trunk circuit is no longer in use.

If the called party should release first and the calling party remains on hook, ground is removed from the signal lead E and releases the relay PL. The released relay PL releases the relay ANS. The released relay ANS removes resistance battery from the base of the transistor Q5 and the relay TO begins to time itself out in the same manner as previously described. When contact TO2 opens, the telephone loop to the TLN 54 opens since the relay RL is still operative. The magnetic core sensor MCS is now unsaturated releasing the relay CBS. The released relay CBS releases the relay RD and reoperates the relay TBM.

The telephone connection is broken and the two-way trunk circuit — E and M is returned to an idle state condition with the idle line termination circuit (capacitor C1 and resistor 24) reconnected across the tip and ring leads of the preceding loop.

For an incoming call from a distant central office, a ground signal from the switching equipment in an outside world is impressed on the signal lead E of the two-way trunk circuit and operates the relay PL. The operated relay PL actuates the contacts PL1 to prepare an operate path to the relay SR. Additionally, the operated relay PL actuates the contacts PL2 and operates the relay LR.

The operated relay LR actuates the contacts LR1, LR2, LR5 and LR6. The actuated contacts LR1 close the circuit to the incoming trunk scanner-marker 62 to mark the particular one of the two-way trunk circuits 61 which has been seized and is requesting service. The actuated contacts LR2 prepare an operate circuit to the relay CBS provided an optional feature of "stop dial" (SD wiring) is included in the trunk circuit. If, however, the optional feature of "wink start" (WS wiring) is included, a circuit from the associated trunk junctor 64 to ground is made ready. The use of either a "stop dial" or a "wink start" optional feature is determined by the type of sender associated with the outside world telephone circuit to which the calling party is connected. When the "stop dial" feature is employed, the sender associated with the outside world telephone circuit will not outpulse until the "stop dial" signal is removed in the two-way trunk circuit 61. When the "wink start" feature is employed, the associated sender will outpulse only after it has received a signal for a predetermined length of time. The actuated contacts LR5 operate the release delay assist relay RDA via contacts RD1 and PL2. The actuated contacts LR6 lock the relay LR to ground.

The operated relay RDA actuates the contacts RDA1 through RDA5. The actuated contacts RDA1 operate the relay CBS if the "stop dial" feature is included. In addition, a signal such as, for example, as a lighted lamp; is operated to indicate the trunk circuit is busy. The actuated contacts RDA2 and RDA3 connect relay SRA into the circuit. The actuated contacts RDA4 remove the idle line termination (resistor R24 and capacitor C1) from the tip and ring leads T and R of the preceding loop. The actuated contacts RDA5 prepare an operate circit to the cutoff relay CO.

The operated relay CBS actuates the contacts CBS1, CBS2,CBS4 and CBS5. The actuated contacts CBS4 enable a negative potential to be transmitted as a "stop dial" signal via the resistive loop over the signal lead M and the signalling equipment to the distant calling central office. The "stop dial" signal tells the register associated with the outside world telephone loop to hold back the sending of dial pulses until a register is attached in the local central office. The actuated contacts CBS1 open a circuit to reduce the holding current to the relay CBS. The actuation of the contacts CBS2 prepare an operate circuit to the relay RD. The actuated contacts CBS5 prepare the answer supervisory lead SRA to the answer supervisory relay (not shown)

in the trunk junctor 64. This relay conditions the trunk junctor for answer supervision.

When the TSLN control 70 (FIG. 1) locates a path between the seized trunk junctor 64 (FIG. 1) and a free trunk register 66 (FIG. 1) a connection between the seized trunk junctor 64 and the located free trunk register 66 is completed. The metallic connection through the tip and ring leads is checked via the TSLN 58 and the sleeve connections are completed. The completion of the sleeve connections impresses a ground potential from the TSLN on the sleeve lead S(in) and the relay CO operates and a release delay relay in the trunk junctor 64 operates.

The operated relay CO actuates the contacts CO1 through CO6. The actuated contacts CO1 release the relay LR. The contacts LR1 open the circuit to the incoming trunk scanner-marker 62 (FIG. 1). The reactuated contacts LR2 opens the circuit to the associated trunk junctor 64, releases the relay CBS and removes the "stop dial" signal. The release of the relay CBS signals the remote central office via the signal lead M to start sending information from its sender to the seized trunk register 66 (FIG. 1). The contacts LR5 open one circuit to ground for the relay RDA, but the relay RDA is held operated through a second circuit including its own contacts RDA6. The contacts LR6 open the path that locks the relay LR to ground when operated.

The released relay CBS reactuates the contacts CBS1, CBS2 and CBS5. The reactuated contacts CBS1 close the circuit from the contacts RDA1 via the SD wiring strap for the stop dial features. The contacts CBS2 open the circuit to the non-operated relay RD. The contacts CBS4 open the circuit through the resistive circuit on the lead M, thereby removing the "stop dial" signal to instruct the remote sender to begin outpulsing. The reactuated contacts CBS5 open the answer supervisory lead SRA but there is no action at this time on an incoming call.

The actuated contacts CO4 and CO6 remove the preseizure battery and ground from the tip and ring leads. The actuated contacts CO5 lock the relay CO to ground. The actuated contacts CO2 open the circuit to prevent the relay LO from operating. The actuated contacts CO3 impress ground via the seize junctor lead SZ to hold on relay RD operated in the associated trunk junctor 64 (FIG. 1). This procedure is necessary to maintain ground on the sleeve lead to hold the switching matrix operated so that the switching train will not release. The relay RD in the junctor maintains ground on the forward sleeve in addition to the rear sleeve.

Dial pulsing is received from the distant central office via the signal lead E, pulsing the relay PL. The received dial pulses are repeated to the seized register 66 via the contacts PL1. Upon completion of the sending of dial pulses, the seized trunk register 66 (FIG. 1) is released. Ground is removed from the sleeve lead S(in). However, the relay CO remains operative via its own contacts RDA5 and RD5.

Should the incoming call be destined for a local subscriber, the code translator 52 (FIG. 1) signals this intent by impressing a ground potential on the local lead LO operating the local relay LO. The operated relay LO actuates the contacts LO1 through LO4 and LO6. The actuated contacts LO1 lock the relay LO to ground through the contacts RDA1. The actuated contacts LO2 prepare the answer supervisory lead SRA. The answer supervisory lead provides a return closed loop out from the junctor 64 and back to the junctor 64 to condition the junctor for answer supervision. The actuating of the contacts LO3 and LO4 prepares the magnetic core sensor (MCS) circuit for local supervision and the operation of the relay CBS. The actuated contacts LO6 close a second circuit to hold the relay CO operative through the contacts RDA5 and RD5. The called party on the selected line circuit **32*a*–32*n* (FIG. 1) is then signalled by ringing accomplished through the ringing circuits 34 (FIG. 1**).

When the called party goes off hook in answer to the ringing signals, the magnetic core sensor (MCS) becomes saturated, and operates the relay CBS. The relay CBS actuates the contacts CBS1, CBS2, CBS4 and CBS5. The contacts CBS1, when actuated, open the bypass around the resistor R7 to reduce the holding current flow therethrough. The actuated contacts CBS2 close the circuit from the relay RD to ground. The relay RD does not operate since the actuated contacts RDA1 has opened the circuit to ground. The actuated contacts CBS4 close the circuit of the signal lead M to provide an answer supervisory signal (resistance battery returned on the lead M is transposed to ground on the outside world telephone circuit's lead E via its associated signalling equipment) in the distant central office.

The telephone connection between the calling and the called parties is now complete and communication between the same may now take place.

If the calling party's call is being interconnected to an outgoing trunk circuit 78 or a two-way trunk circuit 61 in the local office, the code translator 52 will not impress the ground potential on the LO lead. The relays LO and CBS are not operated. However, when the called party has answered in the distant central office, the supervisory assist relay SRA operates and closes the loop in the two-way trunk circuit 61. The operated relay SRA actuates the contacts SRA1 and operates the relay CBS. The operation of the relay CBS initiates the same sequence of events as described heretofore for calling a local subscriber. The telephone connection is now complete for telephone communication between the calling and the called parties.

When the calling party goes on hook and the called party remains off hook, ground is removed from the lead E and releases the relay PL. The released relay PL removes ground from the relay RDA. The removal of ground does not cause the relay RDA to release immediately because of a timing circuit 90 connected thereto.

The timing circuit 90 includes a transistor Q4. The base of the transistor Q4 is connected through a unidirectional circuit, including a diode CR29, to a first ground through the actuated contacts LR5, RDA6 and PL2, depending on the operational sequence. The emitter of the transistor Q4 is connected through a unidirectional circuit including a diode CR30 to the relay DRA. A resistor R18 is connected between the relay RDA and the base of the transistor Q4. A capacitor C6 and a resistor R25 is connected between ground and the base of the transistor Q4. The capacitor C6 is charged when the relay RDA is held operative through the actuated contacts PL2 to the first ground. The capacitor C6 begins to discharge when the contacts PL2 open the circuit to the first ground.

The timing circuit 90 permits the rlay RDA to remain operated for a predetermined period such, for example, as approximately 200 milliseconds, before dropping out, to prevent an accidental disconnection of the telephone connection because of an inadvertent momentary interruption in the connection. The timing circuit 90 is a fairly precise timing circuit permitting the dropping out of the relay RDA to occur within ± 10 percent of the desired expiration time limit. The inclusion of the transistor Q4 transforms the discharge current of the capacitor C6 from a logarithmic function permitting a time variance of from −50 to +200 percent to a substantially straight line function having a time variance of approximately ±10 percent. The relay RDA, when released, removes ground from the relay CO and the relay CO releases. If the called party is local, releasing the relay RDA removes ground from the relay LO and the relay LO releases. The release of the relay RDA also opens the circuit to the magnetic core sensor MCS which now becomes unsaturated. Transformer action of the sensor MCS releases the relay CBS. The seized two-way trunk circuit 61 is released and reverts to an idle state condition with the dummy load (resistor 24 and capacitor 21) reconnected across the tip and ring leads of the preceding loop. The reconnection of the dummy load minimizes ringing of the signalling equipment in the idle trunk circuit which could affect nearby trunk circuits.

When the calling party goes on hook and the two-way trunk circuit 61 is merely an interconnection between two other central offices, the relays PL, RD1 and CO release in the same manner as previously described for a local call termination. However, the relay LO was not operated. The relay CBS was operated by the actuated contacts of the relay SRA. The released relays PL and RD1 release the relay SRA. The released relay SRA releases relay CBS. The released relay CBS releases the seized two-way trunk circuit 61. The two-way trunk circuit — E and M 61 is in an idle state condition.

When the called party goes on hook, and the calling party remains on hook, the sensor MCS becomes unsaturated and the relay CBS releases. The released relay CBS removes ground from the signal lead M and therefore provides a disconnect signal to the calling party of the outside world telephone circuit. The relay PL releases and, in turn, releases the relays RDA, CO and LO. The two-way trunk circuit is now released to an idle state condition with the idle line termination circuit reconnected across the tip and ring leads of the preceding loop.

What is claimed is:

1. In a telephone system including a trunk link network and an outgoing trunk marker-scanner system, an outgoing trunk circuit for interconnecting telephone circuits to trunk lines through the turnk link network comprising:

six relay circuit means;

a voice transmission path including an originating direct current loop circuit for connection between the trunk link network and a voice bridge circuit through parallel contacts of the first, second and third relay circuit means for supplying battery to the trunk link network, and a terminating direct current loop circuit for connection between a trunk line and the voice bridge circuit through contacts of a fourth relay circuit means;

circuit means connecting the fourth relay circuit means to the orginating loop for operating the fourth relay circuit means in response to a closed loop connection;

circuit means for connecting the fifth relay circuit means for operation via contacts of the fourth relay circuit means providing a slow to release operation, wherein the fifth relay circuit means, when operated, provides a holding signal to the trunk link network;

circuit means for connecting said first relay circuit means for operation via contacts of the second, third and fifth relay circuit means providing a first slow to release response when released by the second and third relay circuit means and a shorter release delay when released by the fifth relay circuit means;

circuit means for transmitting a mark signal from said trunk link network to said outgoing trunk scanner-marker;

circuit means connecting said sixth relay circuit means to inhibit the mark signal when operated by said fifth relay circuit means;

circuit means for operating the second relay circuit means through two paths, the first path including the contacts of the second and fifth relay circuit means providing a slow to release operation, and the second path including contacts of the first and second relay cicuit means;

circuit means connecting said third relay circuit means to said terminating loop so that when one polarity of signal is applied thereto the third relay circuit means is bypassed and when another polarity of signal is applied the third circuit means relay is operated, and circuit means for reversing the connections in the originating loop when the third relay circuit means is operated.

2. In a telephone system including a trunk junctor and an incoming trunk scanner-marker system, an incoming trunk circuit interconnecting a trunk line to a trunk junctor comprising:

six relay circuit means;

a voice transmission path forming an originating direct current loop for connection between a trunk line and a voice bridge circuit for supplying battery to the trunk line, and a terminating direct current loop for connecting between a junctor circuit and the voice bridge circuit through contacts of the first and second relay circuit means;

circuit means connecting the third relay circuit means to the originating loop for operating the third relay circuit means in response to a closed circuit in the originating loop;

circuit means for applying a load across the terminating loop through series contacts of the third and fourth relay circuit means;

cicuit means for operating the fifth relay circuit means via contacts of the first, second and third relay circuit means so that contacts of the fifth relay circuit means complete a connection to the incoming trunk scanner-marker providing a request for seizure;

circuit means for operating the first relay circuit means through contacts of the third and fifth relay circuit means to provide a delayed release;

circuit means for operating the second relay circuit means when seized by the junctor circuit and for providing a holding path for the second relay circuit means through contacts of the first, second, fourth and sixth relay circuit means, and providing a seizure signal to the junctor circuit;

circuit means for operating the fourth relay circuit means in response to a signal from the junctor circuit and for providing a holding path for the fourth relay circuit means through contacts of the first and fourth relay circuit means;

circuit means for connecting a sensor circuit to the terminating loop in response to the operation of the fourth relay circuit means and providing battery to the junctor circuit;

circuit means for connecting the sixth relay circuit means to said sensor circuit for operation when the terminating loop is closed, and circuit means for reversing the connections in the originating loop when the sixth relay circuit means is operated.

3. An incoming trunk circuit as defined in claim 2 including:

circuit means for operating said sixth relay circuit means via contacts of the first and fifth relay circuit means to provide a stop dial signal to the junctor.

4. An incoming trunk circuit as defined in claim 2 including:

circuit means for operating said sixth relay circuit means via contacts of the second and fifth relay circuit means to provide a wink start signal to the junctor.

5. In a telephone system including a trunk junctor and an incoming trunk scanner-marker, an incoming trunk circuit for interconnecting a three wire trunk line to a junctor comprising:

seven relay circuit means;

a two wire voice transmission path forming an originating direct current loop circuit for connection via a voice bridge circuit to two wires of the trunk line and via contacts of the first, second and third of said relay circuit means to a junctor circuit for completing the connection when the first, second and third relay circuit means are operated;

circuit means for operating the second relay circuit means by a signal on the third wire of the trunk line;

a load circuit connected across the originating loop through contacts of the first relay circuit means so that the load is removed when the first relay circuit means is operated;

a sensor circuit connected to the two wire transmission path through contacts at the first relay circuit means when said first relay circuit means is not operated, and connected to the two wire path via the repeat coil when the first relay circuit means is operated, said sensor circuit including a unidirectional current path for rendering the sensor responsive to one polarity of signal from said junctor circuit;

circuit means for operating the fourth relay circuit means through a circuit including series contacts of the second and third relay circuit means in series with the parallel contacts of the fourth and fifth relay circuit means, said fourth relay circuit means providing a request for service signal to said incoming trunk scanner-marker when operated;

circuit means for operating the fifth relay circuit means through a circuit including parallel contacts of the fourth and fifth relay circuit means in series with contacts of the second relay circuit means and providing a release delay circuit for the fifth relay circuit means;

circuit means for operating the third relay circuit means by a signal from the junctor circuit and also by a circuit including parallel contacts of the third and sixth relay circuit means in series with contacts of the fifth relay circuit means;

circuit means for operating the first relay circuit means via series contacts of said third and fifth relay circuit means;

circuit means for operating the sixth relay circuit means by a signal from the junctor and providing a hold up path for the sixth relay circuit means through contacts of the sixth and fifth relay circuit means, and circuit means wherein contacts of the sixth relay circuit means disconnect the unidirectional circuit and connect the sensor circuit to a source of direct current potential to provide power to the junctor circuit, and circuit means for connecting the seventh relay circuit means to said sensor so that when the two wire transmission path connected to said sensor is closed the seventh relay circuit means is operated providing an answer supervisory signal to the junctor.

6. An incoming trunk circuit as defined in claim 5 including:

circuit means for operating the seventh relay circuit means through contacts of said fourth circuit means to provide a stop dial signal to the junctor.

7. An incoming trunk circuit as defined in claim 5 including:

circuit means for operating the seventh relay circuit means via contacts of the fourth relay circuit means by the same signal from the junctor circuit that operates the fifth relay circuit means to provide a wink start signal to the junctor.

8. In a telephone system including a trunk link network, an outgoing trunk scanner-marker system and signalling system, an outgoing trunk circuit for interconnecting a telephone circuit to a three wire trunk line through the trunk link network comprising:

six relay circuit means;

a voice transmission path including an originating loop circuit for connection via a voice bridge circuit to two wires of the trunk line and via parallel contacts of the first, second and third relay circuit means to provide battery to the trunk link network;

circuit means for connecting the fourth relay circuit means to the originating loop circuit for operating the fourth relay circuit means in response to a closed loop condition and providing signals corresponding to the open or closed condition of the originating loop to the third line of the trunk circuit;

circuit means for connecting the fifth relay circuit means for operation via contacts of the fourth circuit means providing a slow to release operation, wherein the fifth circuit means, when operated, provides a holding signal to the trunk link network;

circuit means for transmitting a mark signal from the trunk link network to the outgoing trunk scanner-marker;

circuit means connecting said sixth relay circuit means to inhibit the mark signal when operated by said fifth relay circuit means;

circuit means for connecting the first relay circuit means via contacts of the second, third and fifth relay circuit means providing a first slow to release response when released by the second and third relay circuit means and a shorter release delay when released by the fifth relay circuit means;

circuit means for operating a second relay circuit means through two paths, the first path including contacts of the second and fifth relay circuit means and providing a slow to release operation, and the second path including contacts of the first and second relay circuit means, and circuit means responsive to a signal from signalling systems for operating the third relay circuit means wherein the third relay circuit means reverse the connections in the originating loop.

9. In a telephone system including a trunk link network, a trunk junctor and an outgoing trunk scanner-marker system, an outgoing trunk circuit for interconnecting telephone circuits to trunk lines through the trunk link network and an incoming trunk circuit for interconnecting telephone circuits to trunk lines through the trunk junctor comprising:

12 relay circuit means;

voice transmission circuit means including a first direct current loop circuit for connecting the trunk link network and the trunk junctor to a voice bridge circuit through parallel contacts of the first, second and third relay circuit means and parallel contacts of the seventh and ninth relay circuit means for supplying battery to the trunk link network and the trunk junctor and a second direct current loop circuit for connection between a trunk line and the voice bridge circuit through contacts of the fourth and the fifth relay circuit means;

circuit means connecting the fourth relay circuit means to the first loop for operating the fourth relay circuit means in response to a closed loop condition;

circuit means for connecting the fourth relay circuit means to operate when the twelfth relay circuit means operates;

circuit means for connecting the fifth relay circuit means for operation via contacts of the fourth relay circuit means providing a slow to release operation, wherein the fifth relay circuit means, when operated, provides a holding signal to the trunk link network;

circuit means for connecting said first relay circuit means for operation via contacts of the second, third and fifth relay circuit means providing a first slow to release response when released by the second and third relay circuit means and a shorter release delay when released by the fifth relay circuit means;

circuit means for transmitting a mark signal from said trunk link network to said outgoing trunk scanner-marker system;

circuit means connecting said sixth relay circuit means to inhibit the mark signal when operated by said fifth relay circuit means;

circuit means for operating the second relay circuit means through two separate paths, the first path including the contacts of the second and fifth relay circuit means providing a slow to release operation and the second path including contacts of the first, second and third relay circuit means;

circuit means connecting said third relay circuit means to said second loop so that when one polarity of signal is applied thereto, the third relay circuit means is bypassed and when another polarity of signal is applied the third relay circuit means is operated;

circuit means for reversing the connection in the first loop when the third relay circuit means is operated;

circuit means connecting the ninth relay circuit means to the first loop for operating the ninth relay circuit means in response to a closed circuit in the first loop;

circuit means connecting said 12 relay circuit means to said first loop so that when one polarity of signal is applied thereto, the 12 relay circuit means is bypassed and when another polarity of signal is applied, the twelfth relay circuit means is operated;

circuit means for operating the 11th relay circuit means via contacts of the seventh, eighth and ninth relay circuit means so that contacts of the eleventh relay circuit means complete a connection to the incoming trunk scanner-marker system providing a request for seizure;

circuit means for operating the seventh relay circuit means through contacts of the ninth and 11th relay circuit means to provide a delayed release;

circuit means for operating the eighth relay circuit means when seized by the trunk junctor and for providing a holding path for the eighth relay circuit means through contacts of the seventh, eighth and 10th relay circuit means, and for providing a seizure signal to the junctor circuit;

circuit means for operating the 10th relay circuit means in response to a signal from the trunk junctor and for providing a holding path for the 10th relay circuit means through contacts of the seventh and tenth relay circuit means, and circuit means for reversing the connections in the first loop when the fourth relay circuit means is operated.

10. In a telephone system including a trunk junctor, a trunk link network, an outgoing trunk scanner-marker system and an incoming trunk scanner-marker system, an incoming trunk circuit for interconnecting a telephone circuit to a three wire trunk line through the trunk junctor and an outgoing trunk circuit for interconnecting a telephone circuit to a three wire trunk line through the trunk link network comprising:

12 relay circuit means;

voice transmission circuit means including a first direct current loop circuit for connection via a voice bridge circuit and parallel contacts of the first, second and third of said relay circuit means and contacts of the third relay circuit means to the trunk link network and via additional contacts of the fourth relay circuit means to the trunk junctor and a second direct current path for connecting the voice bridge circuit to a trunk line;

circuit means for operating the fifth relay circuit means by a signal on the third wire of the trunk line;

a load circuit connected across the first loop through contacts of the sixth and the seventh relay circuit means so that the load circuit is removed when at least one of the sixth and seventh relay circuit means is operated;

cicuit means for connecting a sensor circuit to the first path through contacts of the sixth relay circuit means and contacts of the eighth relay circuit means and via the voice bridge circuit;

circuit means for operating the ninth relay circuit means through a circuit including parallel contacts of the sixth and ninth relay circuit means and series contacts of the fourth, fifth and seventh relay circuit means, and said ninth relay circuit means providing a request for service signal to the incoming trunk scanner-marker system when operated;

circuit means for operating the sixth relay circuit means through a circuit including parallel contacts of the ninth and sixth relay circuit means in series in with contacts of the seventh and fifth relay circuit means for providing a release delay circuit for the sixth relay circuit means;

circuit means for operating the fourth relay circuit means by a signal from the trunk junctor through a circuit including parallel contacts of the fourth and eighth relay circuit means in series with contacts of the sixth relay circuit means;

circuit means for operating the eighth relay circuit means by a signal from the trunk junctor and providing a hold up path for the eighth relay circuit means through contacts of the sixth and eighth relay circuit means;

circuit means for connecting the 10th relay circuit means to said sensor so that when the first loop is closed, the 10th relay circuit means is operated;

circuit means for operating said third relay circuit means via contacts of the fifth and seventh relay circuit means for providing an answer supervisory signal to the trunk junctor;

circuit means for connecting the 12th relay circuit means to the first loop between said sensor and said voice bridge circuit through contacts of the fifth, sixth and eighth relay circuit means so that when one polarity of signal is applied thereto, the 12th relay circuit means is bypassed and when another polarity of signal is applied, the 12th relay circuit means is operated;

circuit means for connecting the seventh relay circuit means for operation via contacts of the sixth and tenth relay circuit means providing a slow to release operation, wherein the seventh relay circuit means, when operated, provides a holding signal to the trunk link network;

circuit means for transmitting a mark signal from the trunk link network to the outgoing trunk scanner-marker system;

circuit means connecting the 11th relay circuit means to inhibit the mark signal when operated by said seventh relay circuit means;

circuit means for connecting the first relay circuit means via contacts of the third, second and seventh relay circuit means providing a first slow to release response when released by at least one of the third and second relay circuit means and a shorter release delay when released by the seventh relay circuit means, and circuit means for operating said second relay circuit means through a first circuit including contacts of said first, second and third relay circuit means and a second path including contacts of the second and seventh relay circuit means.

* * * * *